United States Patent
Tsai et al.

(10) Patent No.: US 9,554,410 B2
(45) Date of Patent: Jan. 24, 2017

(54) DEVICE-TO-DEVICE USER EQUIPMENT FOR A WIRELESS COMMUNICATION SYSTEM AND RESOURCE SCHEDULING METHOD THEREOF

(71) Applicant: Institute For Information Industry, Taipei (TW)

(72) Inventors: Tsung-Yu Tsai, Tainan (TW); Hsuan-Li Lin, Taipei (TW); Shu-Tsz Liu, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/656,654

(22) Filed: Mar. 12, 2015

(65) Prior Publication Data
US 2015/0264716 A1  Sep. 17, 2015

Related U.S. Application Data

(60) Provisional application No. 61/953,023, filed on Mar. 14, 2014.

(51) Int. Cl.
*H04W 4/00* (2009.01)
*H04W 76/02* (2009.01)
*H04W 72/12* (2009.01)

(52) U.S. Cl.
CPC ....... *H04W 76/023* (2013.01); *H04W 72/1247* (2013.01)

(58) Field of Classification Search
CPC ................. H04W 76/023; H04W 72/1247
See application file for complete search history.

(56) References Cited

U.S. PATENT DOCUMENTS

| 9,265,078 B2 * | 2/2016 | Lim ............... H04W 76/023 |
| 2010/0240312 A1* | 9/2010 | Peng ............... H04W 72/02 455/63.1 |
| 2010/0302945 A1* | 12/2010 | Leppanen ........ H04W 40/246 370/235 |
| 2013/0128858 A1* | 5/2013 | Zou ............... H04W 72/0453 370/329 |
| 2014/0169298 A1* | 6/2014 | Li ............... H04W 72/12 370/329 |
| 2015/0092656 A1* | 4/2015 | Lindh ............... H04W 72/121 370/312 |
| 2015/0245383 A1* | 8/2015 | Seo ............... H04W 76/023 370/336 |
| 2015/0271786 A1* | 9/2015 | Xue ............... H04W 74/0816 370/329 |

(Continued)

FOREIGN PATENT DOCUMENTS

WO    2013075340 A1    5/2013

*Primary Examiner* — Clemence Han
(74) *Attorney, Agent, or Firm* — Skaar Ulbrich Macari, P.A.

(57) ABSTRACT

A device to device (D2D) user equipment (UE) used for a wireless communication system is provided. The D2D UE is located in a network topology including a plurality of transmitting ends and a plurality of receiving ends. The D2D UE may be a transmitting end or a receiving end. The receiving ends perform a resource scheduling procedure several times according to transmitting end sequences echoed from the transmitting ends to schedule the appropriate resources for the transmitting ends so as to prevent a transmission collision.

22 Claims, 15 Drawing Sheets

(56) References Cited

U.S. PATENT DOCUMENTS

2015/0351076 A1\* 12/2015 Pais ................... H04W 72/005
                                                                                                            370/312
2016/0021526 A1\* 1/2016 Niu ..................... H04W 40/244
                                                                                                            370/230

\* cited by examiner ured to store a plurality of pieces of resource demand information and a plurality of priority values of the transmitting ends as well as a plurality of transmitting end sequences. Each of the transmitting ends corresponds to one of the transmitting end sequences. The processor is electrically connected to the transceiver and the storage, and is configured to execute the following operations: generating a first resource scheduling result according to the resource demand information and the priority value of each of the transmitting ends; sending one of the transmitting end sequences respectively in the scheduling resource blocks via the transceiver according to the first resource scheduling result; receiving at least one of the transmitting end sequences respectively in the echo resource blocks via the transceiver; generating a second resource scheduling result according to the transmitting end sequences received from the echo resource blocks and the priority values; and sending one of the transmitting end sequences respectively in the scheduling resource blocks via the transceiver according to the second resource scheduling result.

DEVICE-TO-DEVICE USER EQUIPMENT FOR A WIRELESS COMMUNICATION SYSTEM AND RESOURCE SCHEDULING METHOD THEREOF

PRIORITY

This application claims the benefit of priority based on U.S. Provisional Application Ser. No. 61/953,023 filed on Mar. 14, 2014, which is hereby incorporated by reference in its entirety.

FIELD

The present invention relates to a device-to-device (D2D) user equipment (UE) for a wireless communication system and a resource scheduling method thereof. More particularly, the D2D UE of the present invention executes a resource scheduling procedure several times to avoid transmission collisions.

BACKGROUND

As the wireless communication technologies become matured in recent years, various wireless communication systems have been developed and widely applied in people's daily life to satisfy the users' need for communication. Among these wireless communication systems, the 3GPP LTE ($3^{rd}$ Generation Partnership Project Long Term Evolution) communication system has experienced the rapidest development.

In the 3GPP LTE communication system, UEs that are to transmit data therebetween usually have to take a base station and a core network as media and transmit data via resources allocated by the base station. Although a concept of allowing the UEs to transmit data by directly contending for wireless resources (i.e., device-to-device (D2D) communication) has been proposed in the art and the industry, the existing contention-for-scheduling mechanisms all have a lot of drawbacks.

The existing contention-for-scheduling mechanisms are mainly divided into the purely distributed type and the central assistance type. The purely distributed type is based on the CSMA-CA (Carrier Sense Multiple Access with Collision Avoidance) protocol or the ALOHA protocol, and allows distributed D2D UEs to obtain wireless resources necessary for data transmission. However, the contention-for-scheduling mechanisms of the purely distributed type generally only allow contending for wireless resources on the time axis, and leave much time idle, so the spectrum utilization efficiency is relatively limited.

Additionally, in the contention-for-scheduling mechanism of the central assistance type, the base station needs to obtain the neighborship between D2D UEs and wireless resources needed. In practice, there might be a lot of D2D UEs, so obtaining such information necessitates a large amount of data exchanges. In such a case, having the base station be responsible for the resource scheduling will cause an excessive burden on the base station. Therefore, the contention-for-scheduling mechanisms of the central assistance type are difficult to be implemented.

Accordingly, an urgent need exists in the art to provide a resource scheduling mechanism that allows D2D UEs to obtain wireless resources necessary for direct mode communication with adjacent D2D UES in a distributed way in consideration of the spectrum utilization efficiency.

SUMMARY

Disclosed is a resource scheduling mechanism. The resource scheduling mechanism is based on the two-dimensional time-frequency contention, and allows D2D UEs to obtain wireless resources necessary for direct mode communication with adjacent UEs in a distributed way. Thereby, as compared with the conventional contending-for-scheduling mechanisms of the purely distributed type, the present invention can reduce the idle time and improve the spectrum utilization efficiency so as to improve the quality of service (QoS).

Also disclosed is a device-to-device (D2D) user equipment (UE) for a wireless communication system. The wireless communication system defines a scheduling channel, an echo channel and a plurality of data resource block sets. The scheduling channel comprises a plurality of scheduling resource blocks. The echo channel comprises a plurality of echo resource blocks. The scheduling channel and the echo channel correspond to each other. The scheduling resource blocks and the data resource block sets correspond to each other. The D2D UE is located in a network topology. The network topology includes a plurality of transmitting ends and a plurality of receiving ends, and the D2D UE is one of the receiving ends. The D2D UE comprises a transceiver, a storage, and a processor. The storage is config- Further disclosed is a resource scheduling method for a D2D UE. The D2D UE is used in a wireless communication system and is located in a network topology. The network topology includes a plurality of transmitting ends and a plurality of receiving ends. The D2D UE is one of the receiving ends and comprises a transceiver, a storage and a processor. The storage is configured to store a plurality of pieces of resource demand information and a plurality of priority values of the transmitting ends, and a plurality of transmitting end sequences. Each of the transmitting ends corresponds to one of the transmitting end sequences. The wireless communication system defines a scheduling channel, an echo channel and a plurality of data resource block sets. The scheduling channel comprises a plurality of scheduling resource blocks. The echo channel comprises a plurality of echo resource blocks. The scheduling channel and the echo channel correspond to each other. The scheduling resource blocks and the data resource block sets correspond to each other. The resource scheduling method is executed by the processor and comprises the following steps of: generating a first resource scheduling result according to the resource demand information and the priority value of each of the transmitting ends; sending one of the transmitting end sequences respectively in the scheduling resource blocks via the transceiver according to the first resource scheduling result; receiving at least one of the transmitting end sequences respectively in the echo resource blocks via the transceiver; generating a second resource scheduling result according to the transmitting end sequences received from the echo resource blocks and the priority values; and sending one of the transmitting end sequences respectively in the scheduling resource blocks via the transceiver according to the second resource scheduling result.

Additionally disclosed is a D2D UE for a wireless communication system. The wireless communication system defines a scheduling channel, an echo channel and a plurality of data resource block sets. The scheduling channel comprises a plurality of scheduling resource blocks. The echo channel comprises a plurality of echo resource blocks. The scheduling channel and the echo channel correspond to each other. The scheduling resource blocks and the data resource block sets correspond to each other. The D2D UE is located in a network topology that includes a plurality of transmitting ends and a plurality of receiving ends, and the D2D UE is one of the transmitting ends. The D2D UE comprises a transceiver, a storage and a processor. The storage is configured to store a plurality of transmitting end sequences. The D2D UE corresponds to one of the transmitting end sequences. The processor is electrically connected to the transceiver and the storage, and is configured to execute the following operations: (a) receiving at least one of the transmitting end sequences respectively from the scheduling resource blocks via the transceiver; (b) sending at least one of the transmitting end sequences respectively in the echo resource blocks via the transceiver, wherein the at least one transmitting end sequence transmitted in the echo resource blocks is the same as the at least one transmitting end sequence received from the scheduling resource blocks; and (c) receiving at least one of the transmitting end sequences respectively again from the scheduling resource blocks via the transceiver.

Further disclosed is a resource scheduling method for a D2D UE. The D2D UE is used in a wireless communication system and is located in a network topology. The network topology includes a plurality of transmitting ends and a plurality of receiving ends. The D2D UE is one of the transmitting ends and comprises a transceiver, a storage and a processor. The storage is configured to store a plurality of transmitting end sequences. The D2D UE corresponds to one of the transmitting end sequences. The wireless communication system defines a scheduling channel, an echo channel and a plurality of data resource block sets. The scheduling channel comprises a plurality of scheduling resource blocks. The echo channel comprises a plurality of echo resource blocks. The scheduling channel and the echo channel correspond to each other. The scheduling resource blocks and the data resource block sets correspond to each other. The resource scheduling method is executed by the processor and comprises the following steps of: (a) receiving at least one of the transmitting end sequences respectively from the scheduling resource blocks via the transceiver; (b) sending at least one of the transmitting end sequences respectively in the echo resource blocks via the transceiver, wherein the at least one transmitting end sequence transmitted in the echo resource blocks is the same as the at least one transmitting end sequence received from the scheduling resource blocks; and (c) receiving at least one of the transmitting end sequences respectively again from the scheduling resource blocks via the transceiver.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. It shall be appreciated that, these example embodiments are not intended to limit the present invention to any specific example, embodiment, environment, applications or particular implementations described in these embodiments. Therefore, description of these example embodiments is only for purpose of illustration rather than to limit the present invention, and the scope of this application shall be governed by the claims.

In the following embodiments and the attached drawings, elements unrelated to the present invention are omitted from depiction; and dimensional relationships among individual elements in the attached drawings are illustrated only for ease of understanding, but not to limit the actual scale.

The D2D UE of the present invention is used in a wireless communication system, and has a function of device-to-device direct mode communication. The wireless communication system involved in the present invention may be a wireless communication system conforming to the Long Term Evolution (LTE) standard or some other wireless communication system such as a wireless communication system adopting the Orthogonal Frequency Division Multiplexing Access (OFDMA) communication technology.

Figure 1A:
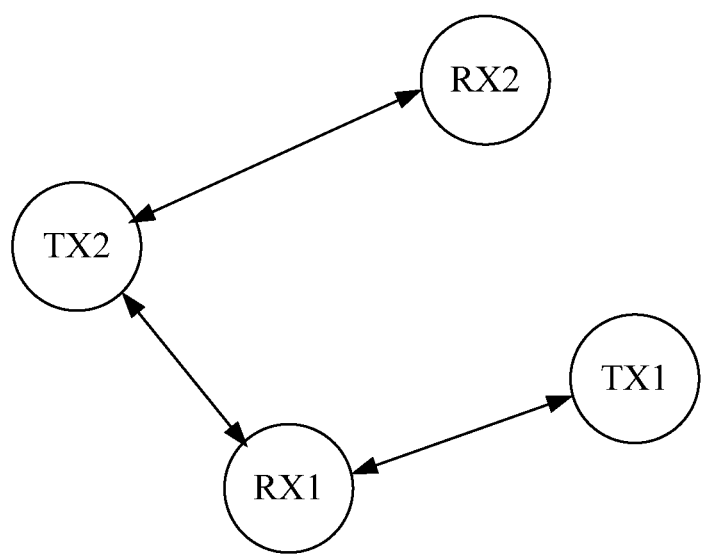
FIG. 1A is a schematic view of a network topology according to a first embodiment of the present invention.

A first embodiment of the present invention is shown in FIG. 1A, which depicts that there are two receiving ends RX1, RX2 and two transmitting ends TX1 and TX2 in a region. The receiving ends RX1, RX2 and the transmitting ends TX1 and TX2 form a network topology. The receiving end RX1 can receive signals transmitted by the transmitting ends TX1 and TX2, while the receiving end RX2 can only receive signals transmitted by the transmitting end TX2. In detail, the transmitting end TX1 may not be located within a signal coverage of the receiving end RX2, or the signal transmission therebetween is blocked due to geographical environment factors. The receiving ends RX1, RX2 and the transmitting ends TX1 and TX2 are all the D2D UEs of the present invention.

The receiving end RX1 learns wireless resources necessary for data transmission of the transmitting ends TX1 and TX2 and transmitting end index values (e.g., connection identifications) of the transmitting ends TX1 and TX2 through receiving resource request messages from the transmitting ends TX1 and TX2. After having learned the wireless resources needed by the transmitting ends TX1, TX2 and the transmitting end index values, the receiving ends RX1 and RX2 generate and store resource demand information and priority values of the transmitting ends TX1 and TX2. In this embodiment, the priority values of the transmitting ends TX1 and TX2 are determined according to the transmitting end index values of the transmitting ends TX1 and TX2, and the transmitting end with a smaller transmitting end index value has a smaller priority value (e.g., the priority value of the transmitting end TX1 is 1, while the priority value of the transmitting end TX2 is 2). In the following descriptions of this embodiment, the transmitting end with a smaller priority value is preferentially allocated a resource block set.

Similarly, the receiving end RX2 learns wireless resources necessary for data transmission of the transmitting end TX2 and the transmitting end index value of the transmitting end TX2 through receiving a resource request message from the transmitting end TX2. After having learned the wireless resources needed by the transmitting end TX2 and the transmitting end index value, the receiving end RX2 generates and stores the resource demand information and the priority value of the transmitting end TX2. Additionally, the receiving ends RX1 and RX2 further store a plurality of transmitting end sequences. The transmitting end index value of each of the transmitting ends TX1 and TX2 corresponds to one of the transmitting end sequences, so the transmitting end TX1 is associated with the transmitting end sequence TS1 and the transmitting end TX2 is associated with the transmitting end sequence TS2. The transmitting end sequences are sequences orthogonal to each other, or the sequences able to be separately identifiable, e.g., Zadoff-Chu sequences. It should be appreciated that, the receiving ends in this embodiment learn the wireless resources needed by the transmitting ends and the transmitting end index values thereof through receiving the resource request messages from the transmitting ends. However, in other embodiments, the receiving ends may learn the wireless resources needed by the surrounding transmitting ends and the transmitting end index values thereof from a base station that they are connecting to.

In this embodiment, the wireless resources may be in units of resource blocks defined by the LTE wireless communication system, or in units similar to the resource blocks defined by the LTE wireless communication system. A resource block is a specific region formed by a time axis and a frequency axis. Because the composition of the resource block can be readily appreciated by those of ordinary skill in the art, it will not be further detailed herein.

Figure 1B:
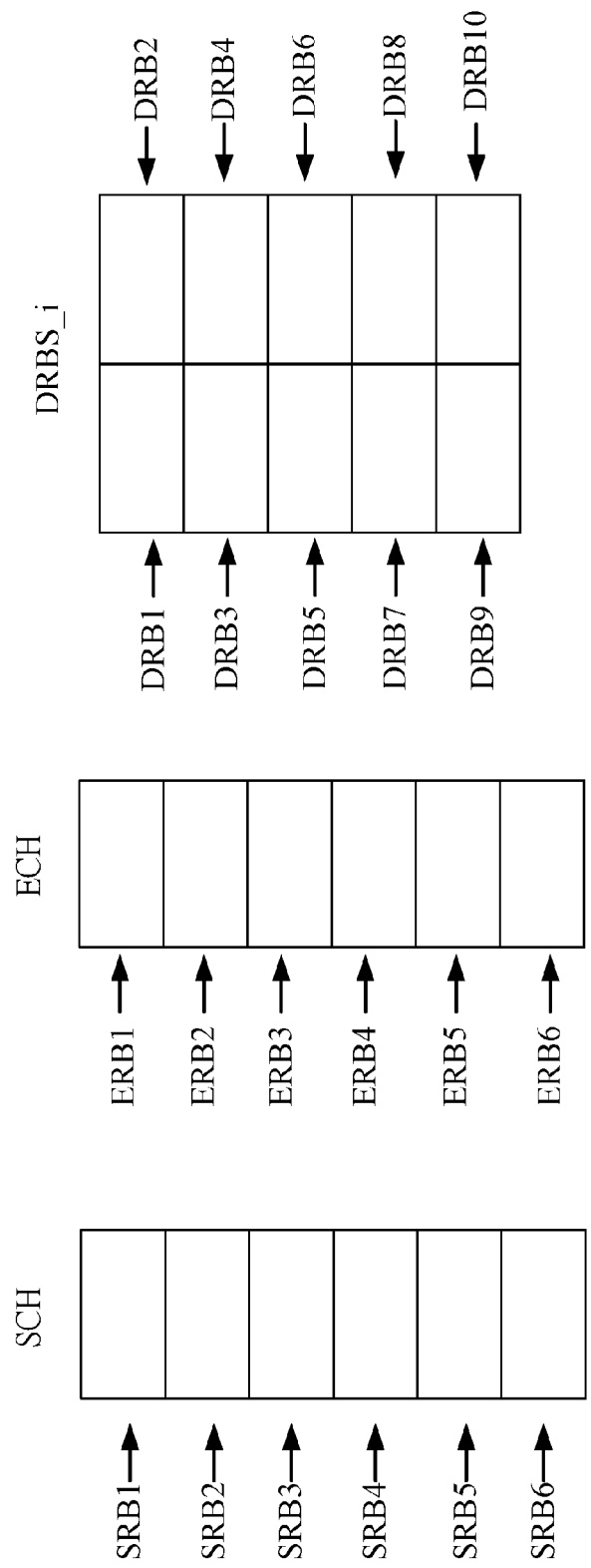
FIG. 1B depicts a scheduling channel SCH, an echo channel ECH and a data resource block set DRBS_i according to the first embodiment of the present invention.

The wireless communication system defines a scheduling channel SCH, an echo channel ECH and a plurality of data resource block sets DRBS_i. For example, as shown in FIG. 1B, the scheduling channel SCH comprises six scheduling resource blocks SRB1~SRB6, and the echo channel ECH comprises six echo resource blocks ERB1~ERB6. The scheduling channel SCH and the echo channel ECH correspond to each other (i.e., SRB1 corresponds to ERB1, and SRB2 corresponds to ERB2 and so on). The scheduling channel SCH and the echo channel ECH appear alternately with time, and the two can be located in a same frequency band or in different frequency bands. For example, the scheduling channel SCH and the echo channel ECH appear in different subframes alternately, and the frequency bands occupied by the two in the respective subframes may be the same or different.

The scheduling resource blocks SRB1~SRB6 correspond to six different data resource block sets DRBS_i respectively, and each of the data resource block sets DRBS_i comprises a plurality of resource blocks. For example, each of the data resource block sets DRBS_i comprises ten data resource blocks DRB1~DRB10, and the scheduling resource blocks SRB1~SRB6 correspond to the data resource block sets DRBS_1~DRBS_6 respectively. The data resource block sets may be adjacent to each other or be distributed. It shall be appreciated that, the number of scheduling resource blocks comprised in the aforesaid scheduling channel SCH, the number of echo resource blocks comprised in the echo channel ECH, the number of data resource block sets, and the number of resource blocks comprised in each of the data resource block sets are provided only for purpose of illustration rather than to limit the scope of the present invention.

In the network topology of FIG. 1A, the maximum and farthest hop number of the network topology is 3 (i.e., 2N+1, where N=1), so the receiving ends RX1 and RX2 of this embodiment need to perform the resource scheduling procedure twice times (i.e. N+1 times). The receiving ends RX1, RX2 and the transmitting ends TX1 and TX2 connect to a backhaul network server (not depicted) via base stations (not depicted) that they are respectively connecting to. The backhaul network server decides the maximum and farthest hop number 2N+1 and informs the transmitting ends TX1, TX2 and the receiving ends RX1 and RX2 of this.

The receiving end RX1 performs a first resource scheduling procedure according to the resource demand information and the priority values of the transmitting ends TX1 and TX2. Herein, suppose that the transmitting end TX1 needs two data resource block sets for data transmission and the transmitting end TX2 needs three data resource block sets for data transmission. Thus, the receiving end RX1 informs the transmitting ends TX1 and TX2 of a first resource scheduling result of the first resource scheduling procedure via the scheduling resource blocks SRB1~SRB6 of the scheduling channel SCH. Similarly, the receiving end RX2 performs the first resource scheduling procedure according to the resource demand information and the priority value of the transmitting end TX2, and informs the transmitting end TX2 of the first resource scheduling result of the first resource scheduling procedure via the scheduling resource blocks SRB1~SRB6 of the scheduling channel SCH.

Figure 1C:
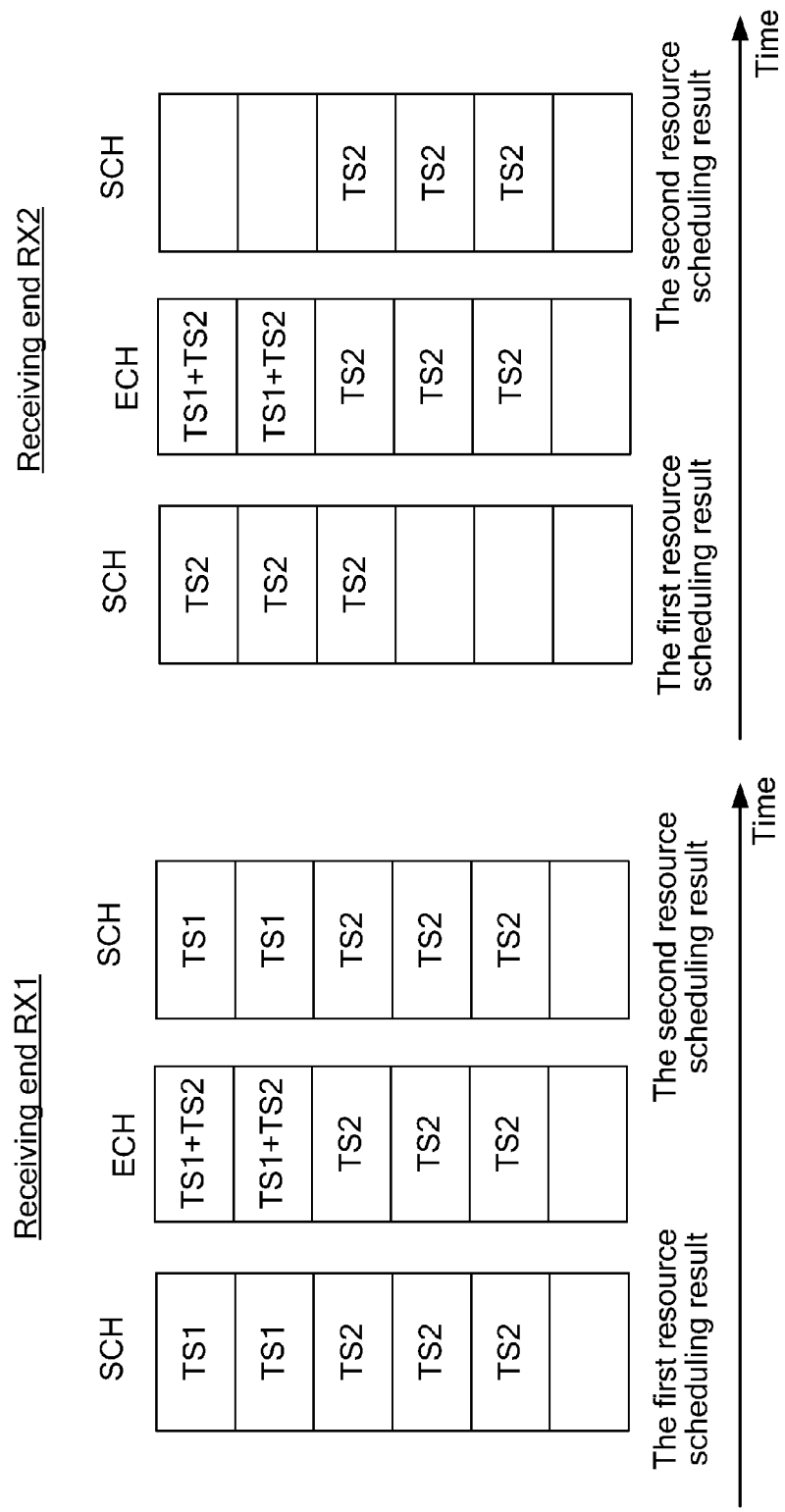
FIG. 1C depicts transmitting end sequences sent in the scheduling channel SCH and transmitting end sequences received in the echo channel ECH by the receiving ends RX1 and RX2 according to the first embodiment of the present invention.

As previously described, the transmitting end with a smaller priority value is preferentially allocated a resource block set; that is, the smaller the priority value is, the higher the priority level will be. Therefore, the receiving end firstly allocates the data resource block set DRBS_i with a smaller serial number to the transmitting end with a smaller priority value. As shown in FIG. 1C, in the first resource scheduling result of the first resource scheduling procedure, the receiving end RX1 allocates the data resource block sets DRBS_1~DRBS_2 to the transmitting end TX1, and allocates the data resource block sets DRBS_3~DRBS_5 to the transmitting end TX2. Then, the receiving end RX1 sends the transmitting end sequence TS1 in the scheduling resource blocks SRB1~SRB2 of the scheduling channel SCH, and sends the transmitting end sequence TS2 in the scheduling resource blocks SRB3~SRB5. On the other hand, in the first resource scheduling result of the first resource scheduling procedure, the receiving end RX2 allocates the data resource block sets DRBS_1~DRBS_3 to the transmitting end TX2. Then, the receiving end RX2 sends the transmitting end sequence TS2 in the scheduling resource blocks SRB1~SRB3 of the scheduling channel SCH.

Figure 1D:
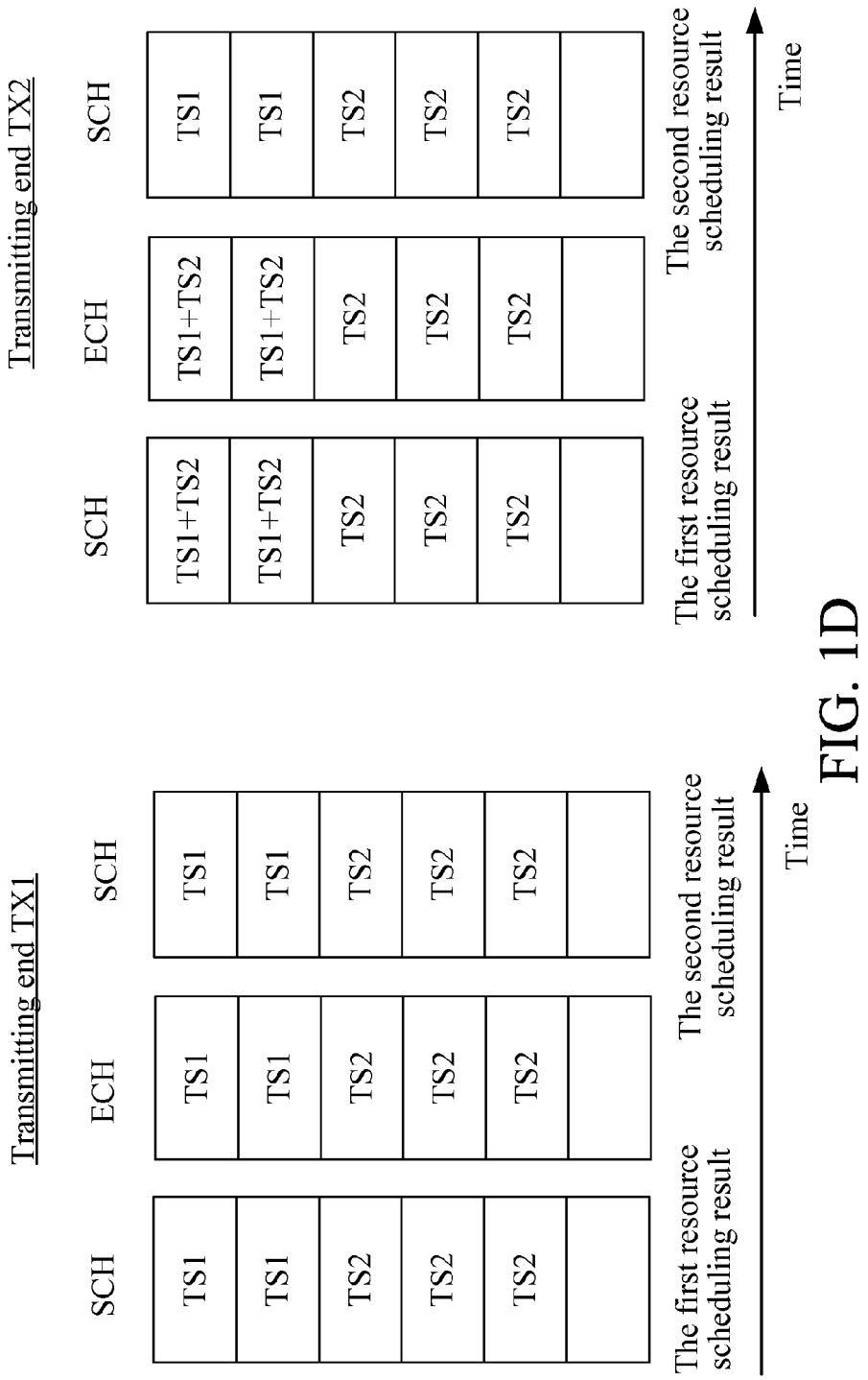
FIG. 1D depicts transmitting end sequences received in the scheduling channel SCH and transmitting end sequences sent in the echo channel ECH by the transmitting ends TX1 and TX2 according to the first embodiment of the present invention.

Afterwards, as shown in FIG. 1D, the transmitting end TX1 receives the transmitting end sequence TS1 in the scheduling resource blocks SRB1~SRB2 of the scheduling channel SCH, and receives the transmitting end sequence TS2 in the scheduling resource blocks SRB3~SRB5 of the scheduling channel SCH. Then, the transmitting end TX1 sends the transmitting end sequences, which are received by the transmitting end TX1 in the scheduling channel SCH, via the echo channel ECH (i.e., to send the transmitting end sequence TS1 in the echo resource blocks ERB1~ERB2 and send the transmitting end sequence TS2 in the echo resource blocks ERB3~ERB5). Similarly, the transmitting end TX2 receives the transmitting end sequence TS2 in the scheduling resource blocks SRB1~SRB3 of the scheduling channel SCH. Then, the transmitting end TX2 sends the transmitting end sequence, which is received by the transmitting end TX2 in the scheduling channel SCH, via the echo channel ECH (i.e., to send the transmitting end sequence TS2 in the echo resource blocks ERB1~ERB3).

Next, the receiving end RX1 performs a second resource scheduling procedure, and determines whether there are two or more transmitting end sequences in the echo resource blocks ERB1~ERB6 of the echo channel ECH. If the determination result is "yes", it means that there is a data resource block set DRBS_i that is allocated to the transmitting ends TX1 and TX2 simultaneously, so the scheduling resource blocks for sending the transmitting end sequences TS1, TS2 need to be further adjusted according to the priority values of the transmitting ends TX1 and TX2. Otherwise, if the answer is "no", there is no need for the receiving end RX1 to make any adjustment. In this embodiment, the transmitting end sequences TS1 and TS2 are received by the receiving end RX1 simultaneously in the echo resource blocks ERB1~ERB2 of the echo channel ECH. Therefore, the receiving end RX1 further determines that the priority value of the transmitting end TX1 is smaller than that of the transmitting end TX2 and, thus, decides to still allocate the data resource block sets DRSB_1~DRBS_2 to the transmitting end TX1. Then, according to the second resource scheduling result of the second resource scheduling procedure, the receiving end RX1 still allocates the data resource block sets DRBS_1~DRBS_2 to the transmitting end TX1, and allocates the data resource block sets DRBS_3~DRBS_5 to the transmitting end TX2. Finally, the receiving end RX1 sends the transmitting end sequence TS1 in the scheduling resource blocks SRB1~SRB2 of the scheduling channel SCH, and sends the transmitting end sequence TS2 in the scheduling resource blocks SRB3~SRB5.

On the other hand, the receiving end RX2 also performs the second resource scheduling procedure, and determines whether there are two or more transmitting end sequences in the echo resource blocks ERB1~ERB6 of the echo channel ECH. In this embodiment, the transmitting end sequences TS1 and TS2 are also received by the receiving end RX2 simultaneously in the echo resource blocks ERB1~ERB2 of the echo channel ECH, so the receiving end RX2 further determines that the priority value of the transmitting end TX2 is greater than that of the transmitting end TX1. Therefore, the first resource scheduling result of the first resource scheduling procedure needs to be adjusted by skipping the data resource block sets DRBS_1~DRBS_2 and allocating the data resource block sets DRBS_3~DRBS_5 with greater serial numbers to the transmitting end TX2. Then, the receiving end RX2 sends the transmitting end sequence TS2 in the scheduling resource blocks SRB3~SRB5 of the scheduling channel SCH according to the second resource scheduling result of the second resource scheduling procedure.

Accordingly, the transmitting end TX1 can perform data transmission through the use of the data resource block sets DRBS_1~DRBS_2 according to the transmitting end sequence TS1 of the scheduling resource blocks SRB1~SRB2, and the transmitting end TX2 can perform data transmission through the use of the data resource block sets DRBS_3~DRBS_5 according to the transmitting end sequence TS2 of the scheduling resource blocks SRB3~SRB5. As can be known from this, through the first resource scheduling procedure and the second resource scheduling procedure described above, the present invention allocates data resource block sets DRBS_i with greater serial numbers to transmitting ends with greater priority values, so it can be avoided that a same data resource block set DRBS_i is allocated by the receiving ends RX1 and RX2 to the transmitting ends TX1 and TX2 simultaneously.

Figure 2A:
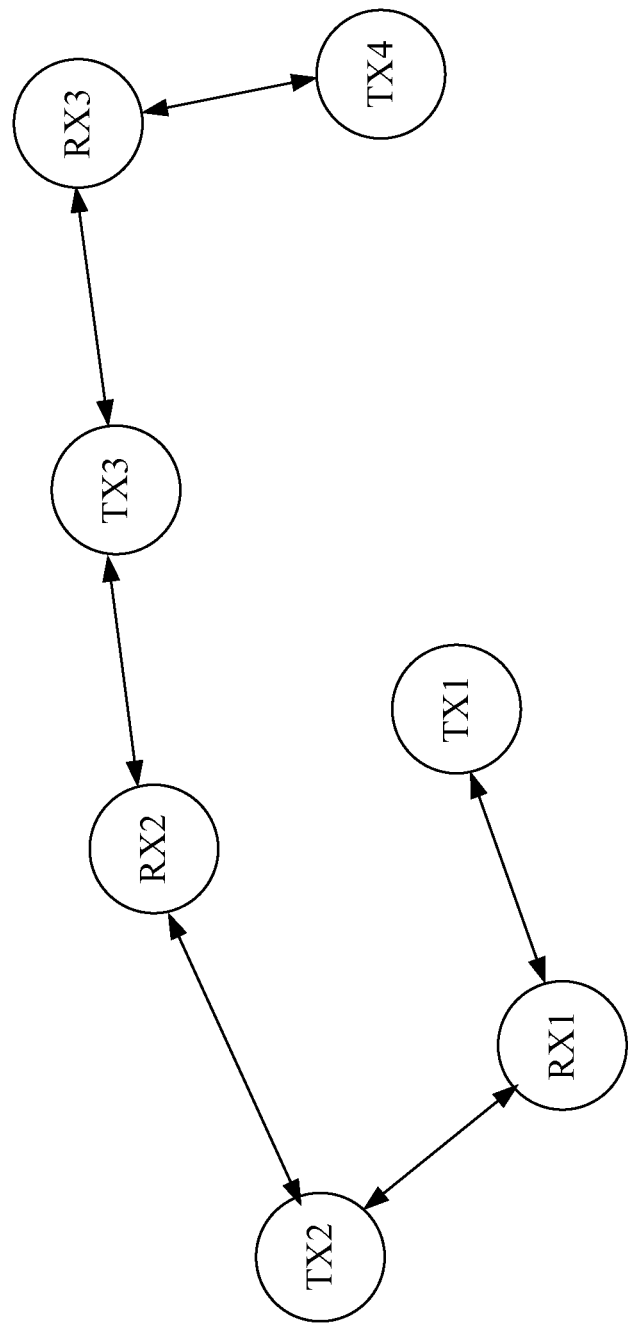
FIG. 2A is a schematic view of a network topology according to a second embodiment of the present invention.

A second embodiment of the present invention is shown in FIG. 2A, which depicts that there are three receiving ends RX1, RX2, RX3 and four transmitting ends TX1, TX2, TX3 and TX4 in a region. The receiving end RX1 can receive signals transmitted by the transmitting ends TX1 and TX2; the receiving end RX2 can receive signals transmitted by the transmitted ends TX2 and TX3; and the receiving end RX3 can receive signals transmitted by the transmitted ends TX3 and TX4. The receiving ends RX1, RX2, RX3 and the transmitting ends TX1, TX2, TX3 and TX4 are all the D2D UEs of the present invention.

In the network topology of FIG. 2A, the maximum and farthest hop number is 5 (i.e., 2N+1, where N=2), so the receiving ends RX1, RX2 and RX3 of this embodiment need to perform the resource scheduling procedure three times (i.e. N+1 times). For purpose of simplicity, the following description will be made with reference to FIGS. 2B-2H for each of the receiving ends RX1, RX2, RX3 and each of the transmitting ends TX1, TX2, TX3, TX4 in the scheduling channel SCH and the echo channel ECH during respective resource scheduling procedure stages. Moreover, it is supposed herein that the transmitting ends TX1, TX2, TX3 and TX4 respectively need two, one, two and one data resource block set for data transmission and the priority values of the transmitting ends TX1, TX2, TX3, and TX4 are 1, 2, 3, and 4 respectively.

Figure 2B:
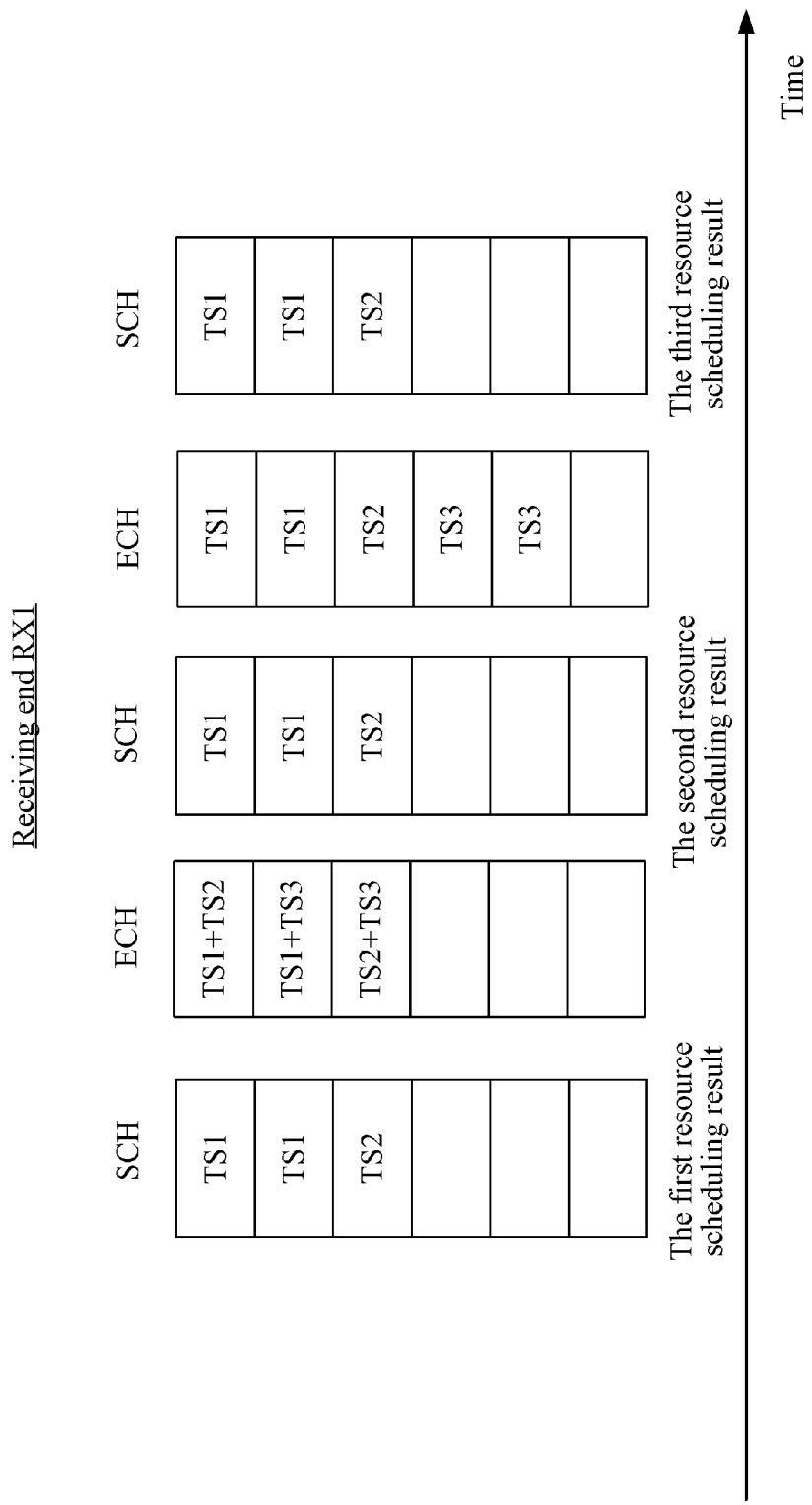
FIG. 2B depicts transmitting end sequences sent in the scheduling channel SCH and transmitting end sequences received in the echo channel ECH by the receiving end RX1 according to the second embodiment of the present invention.

Referring firstly to FIG. 2B, in the first resource scheduling procedure, the receiving end RX1 allocates the data resource block sets DRBS_1~DRBS_2 to the transmitting end TX1, and allocates the data resource block set DRBS_3 to the transmitting end TX2. Then, the receiving end RX1 sends the transmitting end sequence TS1 in the scheduling resource blocks SRB1~SRB2, and sends the transmitting end sequence TS2 in the scheduling resource block SRB3. Afterwards, the receiving end RX1 receives the transmitting end sequences TS1 and TS2 simultaneously in the echo resource block ERB1, receives the transmitting end sequences TS1 and TS3 simultaneously in the echo resource block ERB2, and receives the transmitting end sequences TS2 and TS3 simultaneously in the echo resource block ERB3.

Next, in the second resource scheduling procedure, the receiving end RX1 determines whether each of the echo resource blocks comprises two or more transmitting end sequences, and adjusts the transmitting end sequences sent in the scheduling resource blocks according to the priority values of the transmitting ends corresponding to the transmitting end sequences. Accordingly, in the second resource scheduling procedure, the receiving end RX1 allocates the data resource block sets DRBS_1~DRBS_2 to the transmitting end TX1, and allocates the data resource block set DRBS_3 to the transmitting end TX2. Afterwards, the receiving end RX1 sends the transmitting end sequence TS1 in the scheduling resource blocks SRB1~SRB2, and sends the transmitting end sequence TS2 in the scheduling resource block SRB3. Then, the receiving end RX1 receives the transmitting end sequence TS1 in the echo resource blocks ERB1 and ERB2, receives the transmitting end sequence TS2 in the echo resource block ERB3, and receives the transmitting end sequence TS3 in the echo resource blocks ERB4 and ERB5.

Finally, in the third resource scheduling procedure, the receiving end RX1 determines that each of the echo resource blocks has only one transmitting end sequence, so the second resource scheduling result of the second resource scheduling procedure remains unchanged: that is, the data resource block sets DRBS_1~DRBS_2 are allocated to the transmitting end TX1, the data resource block set DRBS_3 is allocated to the transmitting end TX2, the transmitting end sequence TS1 is sent in the scheduling resource blocks SRB1~SRB2, and the transmitting end sequence TS2 is sent in the scheduling resource block SRB3.

Figure 2C:
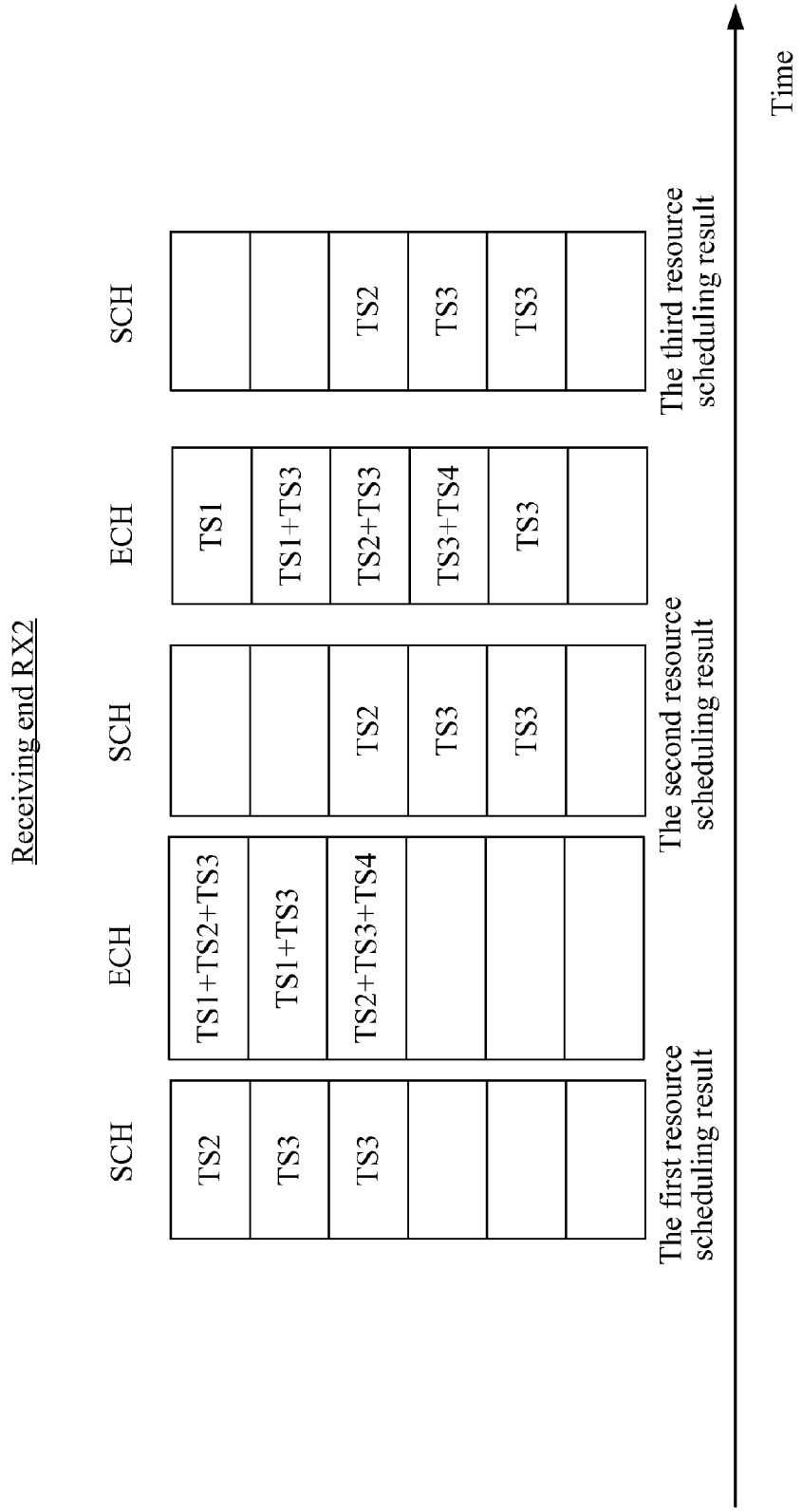
FIG. 2C depicts transmitting end sequences sent in the scheduling channel SCH and transmitting end sequences received in the echo channel ECH by the receiving end RX2 according to the second embodiment of the present invention.

Referring to FIG. 2C, in the first resource scheduling procedure, the receiving end RX2 allocates the data resource block set DRBS_1 to the transmitting end TX2, and allocates the data resource block sets DRBS_2~DRBS_3 to the transmitting end TX3. Then, the receiving end RX2 sends the transmitting end sequence TS2 in the scheduling resource block SRB1, and sends the transmitting end sequence TS3 in the scheduling resource blocks SRB2~SRB3. Afterwards, the receiving end RX2 receives the transmitting end sequences TS1, TS2 and TS3 simultaneously in the echo resource block ERB1, receives the transmitting end sequences TS1 and TS3 simultaneously in the echo resource block ERB2, and receives the transmitting end sequences TS2, TS3 and TS4 simultaneously in the echo resource block ERB3.

Then, in the second resource scheduling procedure, the receiving end RX2 determines whether each of the echo resource blocks comprises two or more transmitting end sequences, and adjusts the transmitting end sequences sent in the scheduling resource blocks according to the priority values of the transmitting ends corresponding to the transmitting end sequences. Accordingly, in the second resource scheduling procedure, the receiving end RX2 allocates the data resource block set DRBS_3 to the transmitting end TX2, and allocates the data resource block sets DRBS_4~DRBS_5 to the transmitting end TX3. Then, the receiving end RX2 sends the transmitting end sequence TS2 in the scheduling resource block SRB3, and sends the transmitting end sequence TS3 in the scheduling resource blocks SRB4~SRB5. Afterwards, the receiving end RX2 receives the transmitting end sequence TS1 in the echo resource block ERB1, receives the transmitting end sequences TS1 and TS3 simultaneously in the echo resource block ERB2, receives the transmitting end sequences TS2 and TS3 simultaneously in the echo resource block ERB3, receives the transmitting end sequences TS3 and TS4 simultaneously in the echo resource block ERB4, and receives the transmitting end sequence TS3 in the echo resource block ERB5.

Finally, in the third resource scheduling procedure, the receiving end RX2 determines whether each of the echo resource blocks comprises two or more transmitting end sequences and, according to the priority values of the transmitting ends, determines whether the scheduling resource blocks for sending the transmitting end sequences need to be adjusted. Because the priority value of the transmitting end TX2 is smaller than the priority value of the transmitting end TX3 which, in turn, is smaller than that of the transmitting end TX4, the receiving end RX2 keeps the second resource scheduling result of the second resource scheduling procedure unchanged: that is, the data resource block set DRBS_3 is allocated to the transmitting end TX2, the data resource block sets DRBS_4~DRBS_5 are allocated to the transmitting end TX3, the transmitting end sequence TS2 is sent in the scheduling resource block SRB3, and the transmitting end sequence TS3 is sent in the scheduling resource blocks SRB4~SRB5.

Figure 2D:
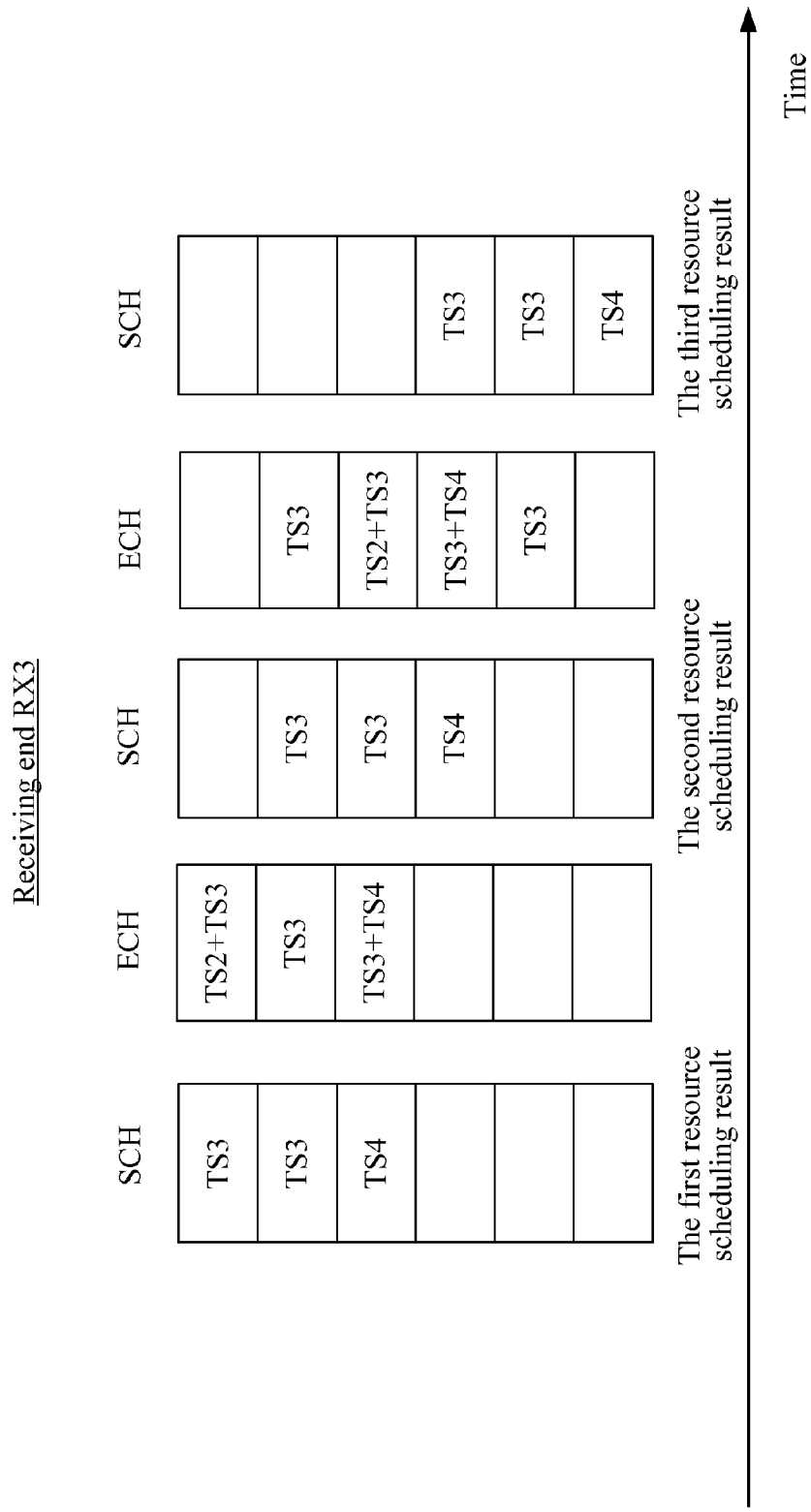
FIG. 2D depicts transmitting end sequences sent in the scheduling channel SCH and transmitting end sequences received in the echo channel ECH by the receiving end RX3 according to the second embodiment of the present invention.

Referring to FIG. 2D, in the first resource scheduling procedure, the receiving end RX3 allocates the data resource block sets DRBS_1~DRBS_2 to the transmitting end TX3, and allocates the data resource block set DRBS_3 to the transmitting end TX4. Then, the receiving end RX3 sends the transmitting end sequence TS3 in the scheduling resource blocks SRB1~SRB2, and sends the transmitting end sequence TS4 in the scheduling resource block SRB3. Afterwards, the receiving end RX3 receives the transmitting end sequences TS2 and TS3 simultaneously in the echo resource block ERB1, receives the transmitting end sequence TS3 in the echo resource block ERB2, and receives the transmitting end sequences TS3 and TS4 simultaneously in the echo resource block ERB3.

Then, in the second resource scheduling procedure, the receiving end RX3 determines whether each of the echo resource blocks comprises two or more transmitting end sequences, and adjusts the transmitting end sequences sent in the scheduling resource blocks according to the priority values of the transmitting ends corresponding to the transmitting end sequences. Accordingly, in the second resource scheduling procedure, the receiving end RX3 allocates the data resource block sets DRBS_2~DRBS_3 to the transmitting end TX3, and allocates the data resource block set DRBS_4 to the transmitting end TX4. Afterwards, the receiving end RX3 sends the transmitting end sequence TS3 in the scheduling resource blocks SRB2~SRB3, and sends the transmitting end sequence TS4 in the scheduling resource block SRB4. Then, the receiving end RX3 receives the transmitting end sequence TS3 in the echo resource block ERB2, receives the transmitting end sequences TS2 and TS3 simultaneously in the echo resource block ERB3, receives the transmitting end sequences TS3 and TS4 simultaneously in the echo resource block ERB4, and receives the transmitting end sequence TS3 in the echo resource block ERB5.

Finally, in the third resource scheduling procedure, the receiving end RX3 determines whether each of the echo resource blocks comprises two or more transmitting end sequences and, according to the priority values of the transmitting ends, determines whether the scheduling resource blocks for sending the transmitting end sequences need to be adjusted. Because the priority value of the transmitting end TX2 is smaller than the priority value of the transmitting end TX3 which, in turn, is smaller than that of the transmitting end TX4, the receiving end RX3 adjusts the second resource scheduling result of the second resource scheduling procedure so that the data resource block sets DRBS_4~DRBS_5 are allocated to the transmitting end TX3, the data resource block set DRBS_6 is allocated to the transmitting end TX4, the transmitting end sequence TS3 is sent in the scheduling resource blocks SRB4~SRB5, and the transmitting end sequence TS4 is sent in the scheduling resource block SRB6.

Figure 2E:
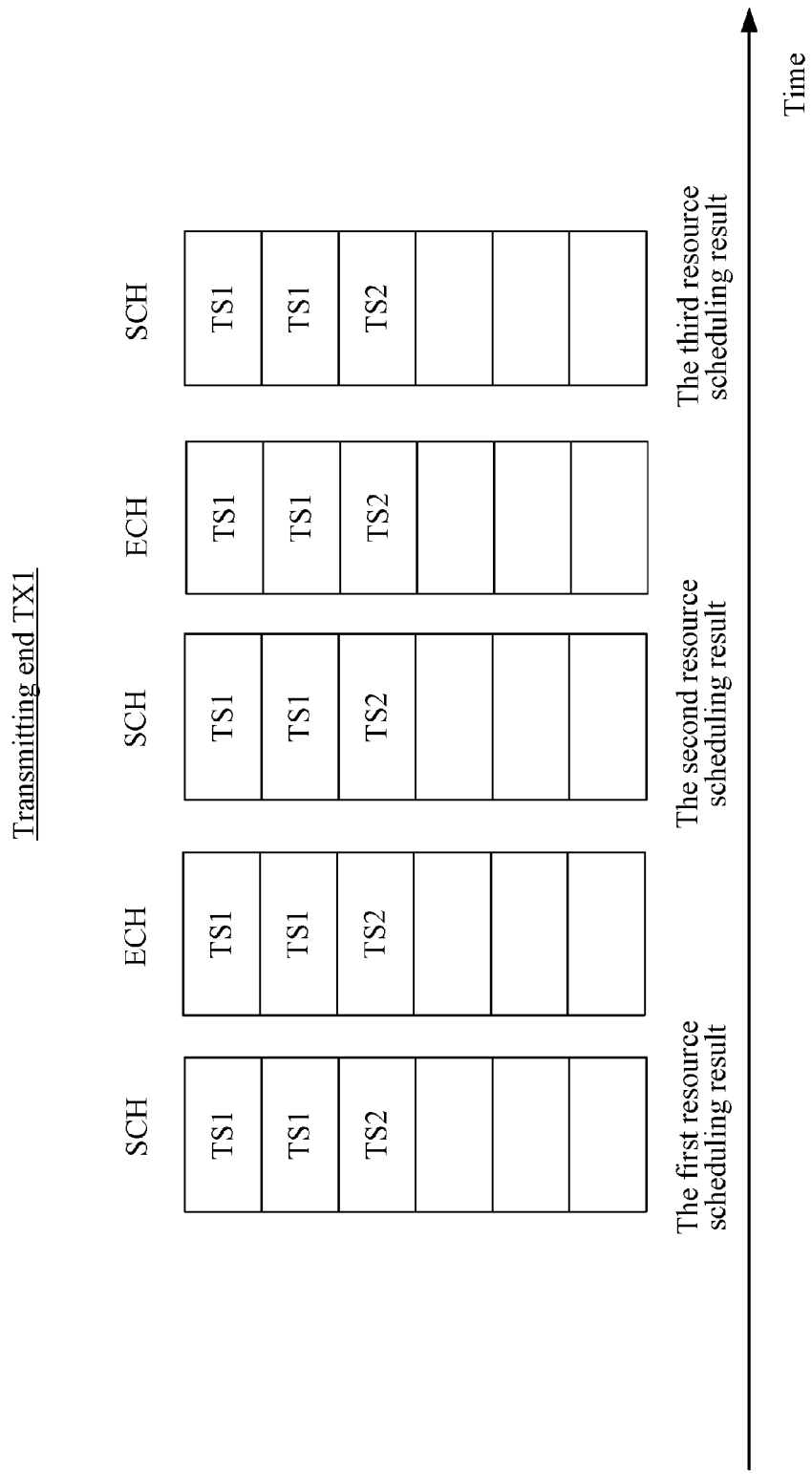
FIG. 2E depicts transmitting end sequences received in the scheduling channel SCH and transmitting end sequences sent in the echo channel ECH by the transmitting end TX1 according to the second embodiment of the present invention.

Referring to FIG. 2E, in response to the first resource scheduling result of the receiving end RX1, the transmitting end TX1 receives the transmitting end sequence TS1 in the scheduling resource blocks SRB1~SRB2 and receives the transmitting end sequence TS2 in the scheduling resource block SRB3. Then, the transmitting end TX1 sends the transmitting end sequences, which are received by the transmitting end TX1 in the scheduling channel SCH, via the echo channel ECH (i.e., to send the transmitting end sequence TS1 in the echo resource blocks ERB1~ERB2 and send the transmitting end sequence TS2 in the echo resource block ERB3).

Afterwards, in response to the second resource scheduling result of the receiving end RX1, the transmitting end TX1 still receives the transmitting end sequence TS1 in the scheduling resource blocks SRB1~SRB2, and receives the transmitting end sequence TS2 in the scheduling resource block SRB3. Likewise, the transmitting end TX1 sends the transmitting end sequences, which are received by the transmitting end TX1 in the scheduling channel SCH, via the echo channel ECH (i.e., to send the transmitting end sequence TS1 in the echo resource blocks ERB1~ERB2 and send the transmitting end sequence TS2 in the echo resource block ERB3). Finally, in response to the third resource scheduling result of the receiving end RX1, the transmitting end TX1 receives the transmitting end sequence TS1 in the scheduling resource blocks SRB1~SRB2 and receives the transmitting end sequence TS2 in the scheduling resource block SRB3 again.

Figure 2F:
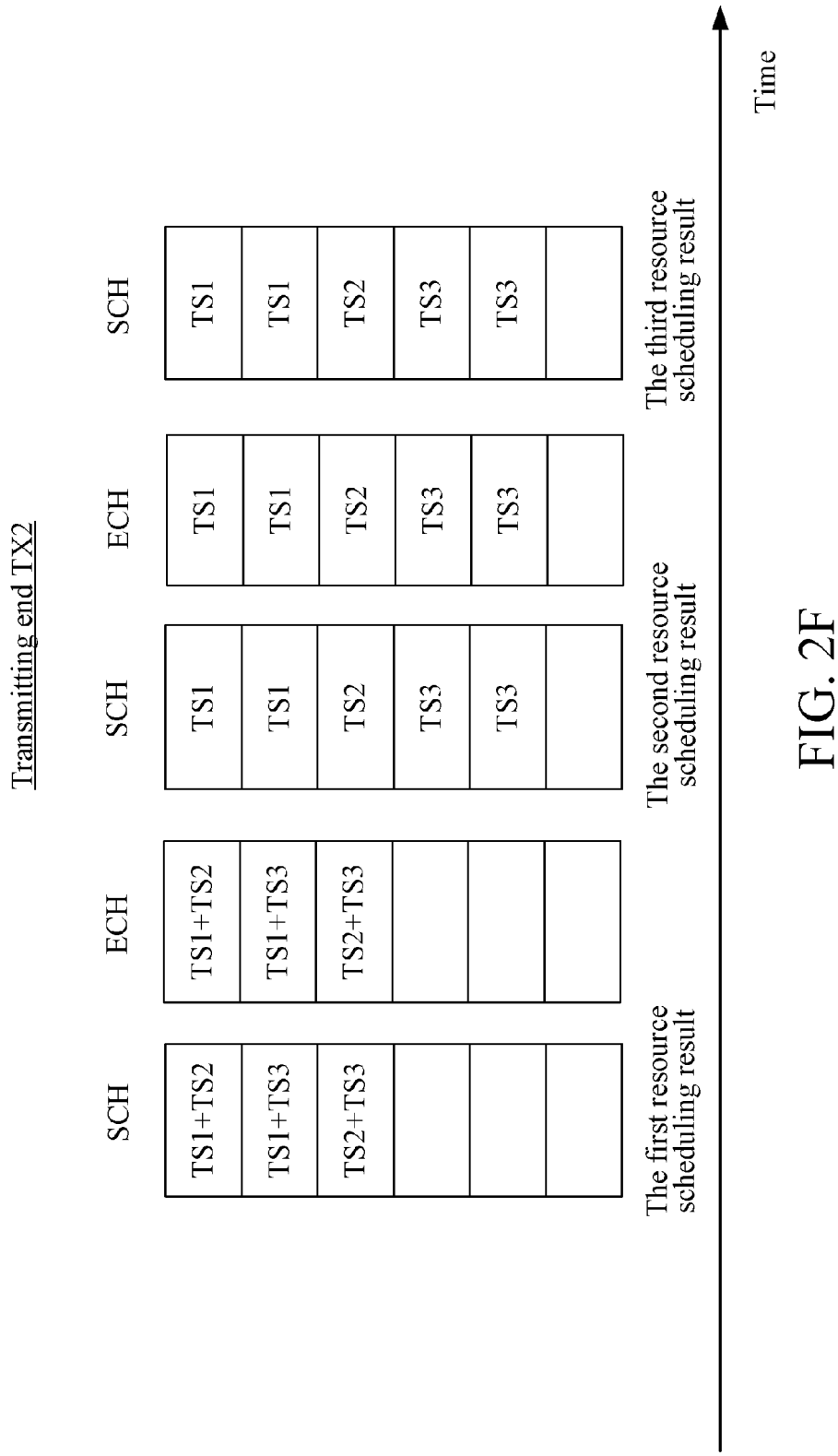
FIG. 2F depicts transmitting end sequences received in the scheduling channel SCH and transmitting end sequences sent in the echo channel ECH by the transmitting end TX2 according to the second embodiment of the present invention.

Referring to FIG. 2F, in response to the first resource scheduling result of the receiving ends RX1 and RX2, the transmitting end TX2 receives the transmitting end sequences TS1 and TS2 simultaneously in the scheduling resource block SRB1, receives the transmitting end sequences TS1 and TS3 simultaneously in the scheduling resource block SRB2, and receives the transmitting end sequences TS2 and TS3 simultaneously in the scheduling resource block SRB3. Then, the transmitting end TX2 sends the transmitting end sequences, which are received by the transmitting end TX2 in the scheduling channel SCH, via the echo channel ECH (i.e., to send the transmitting end sequences TS1 and TS2 in the echo resource block ERB1, send the transmitting end sequences TS1 and TS3 in the echo resource block ERB2, and send the transmitting end sequences TS2 and TS3 in the echo resource block ERB3).

Afterwards, in response to the second resource scheduling result of the receiving ends RX1 and RX2, the transmitting end TX2 receives the transmitting end sequence TS1 in the scheduling resource blocks SRB1~SRB2, receives the transmitting end sequence TS2 in the scheduling resource block SRB3, and receives the transmitting end sequence TS3 in the scheduling resource blocks SRB4~SRB5. Then, the transmitting end TX2 sends the transmitting end sequences, which are received by the transmitting end TX2 in the scheduling channel SCH, via the echo channel ECH (i.e., to send the transmitting end sequence TS1 in the echo resource blocks ERB1~ERB2, send the transmitting end sequence TS2 in the echo resource block ERB3, and send the transmitting end sequence TS3 in the echo resource blocks ERB4~ERB5). Finally, in response to the third resource scheduling result of the receiving ends RX1 and RX2, the transmitting end TX2 receives the transmitting end sequence TS1 in the scheduling resource blocks SRB1~SRB2, receives the transmitting end sequence TS2 in the scheduling resource block SRB3, and receives the transmitting end sequence TS3 in the scheduling resource blocks SRB4~SRB5.

Figure 2G:
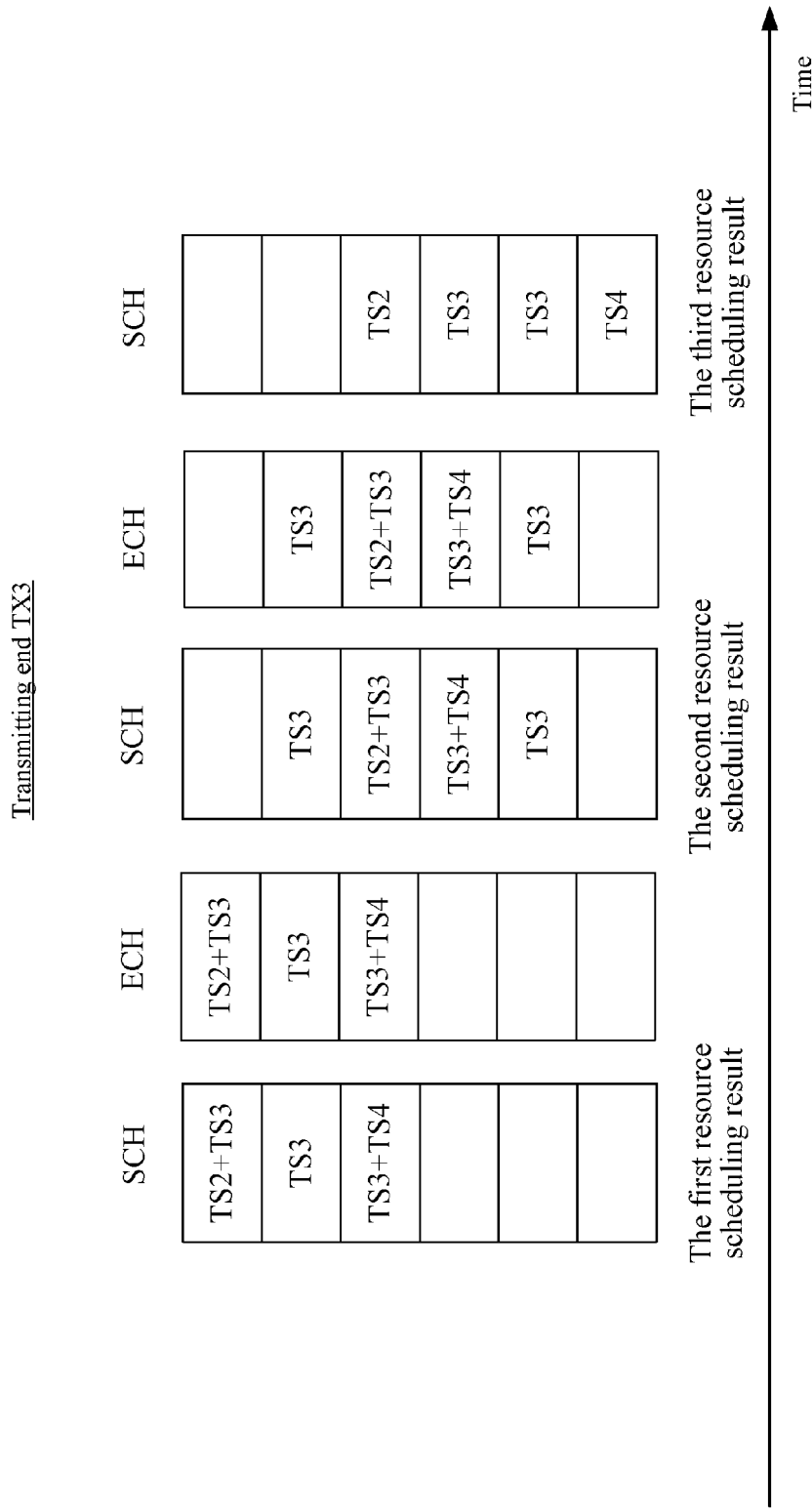
FIG. 2G depicts transmitting end sequences received in the scheduling channel SCH and transmitting end sequences sent in the echo channel ECH by the transmitting end TX3 according to the second embodiment of the present invention.

Referring to FIG. 2G, in response to the first resource scheduling result of the receiving ends RX2 and RX3, the transmitting end TX3 receives the transmitting end sequences TS2 and TS3 simultaneously in the scheduling resource block SRB1, receives the transmitting end sequence TS3 in the scheduling resource block SRB2, and receives the transmitting end sequences TS3 and TS4 simultaneously in the scheduling resource block SRB3. Then, the transmitting end TX3 sends the transmitting end sequences, which are received by the transmitting end TX3 in the scheduling channel SCH, via the echo channel ECH (i.e., to send the transmitting end sequences TS2 and TS3 in the echo resource block ERB1, send the transmitting end sequence TS3 in the echo resource block ERB2, and send the transmitting end sequences TS3 and TS4 in the echo resource block ERB3).

Afterwards, in response to the second resource scheduling result of the receiving ends RX2 and RX3, the transmitting end TX3 receives the transmitting end sequence TS3 in the scheduling resource block SRB2, receives the transmitting end sequences TS2 and TS3 simultaneously in the scheduling resource block SRB3, receives the transmitting end sequences TS3 and TS4 simultaneously in the scheduling resource block SRB4, and receives the transmitting end sequence TS3 in the scheduling resource block SRB5. Then, the transmitting end TX3 sends the transmitting end sequences, which are received by the transmitting end TX3 in the scheduling channel SCH, via the echo channel ECH (i.e., to send the transmitting end sequence TS3 in the echo resource block ERB2, send the transmitting end sequences TS2 and TS3 in the echo resource block ERB3, send the transmitting end sequences TS3 and TS4 in the echo resource block ERB4, and send the transmitting end sequence TS3 in the echo resource block ERB5). Finally, in response to the third resource scheduling result of the receiving ends RX2 and RX3, the transmitting end TX3 receives the transmitting end sequence TS2 in the scheduling resource block SRB3, receives the transmitting end sequence TS3 in the scheduling resource blocks SRB4~SRB5, and receives the transmitting end sequence TS4 in the scheduling resource block SRB6.

Figure 2H:
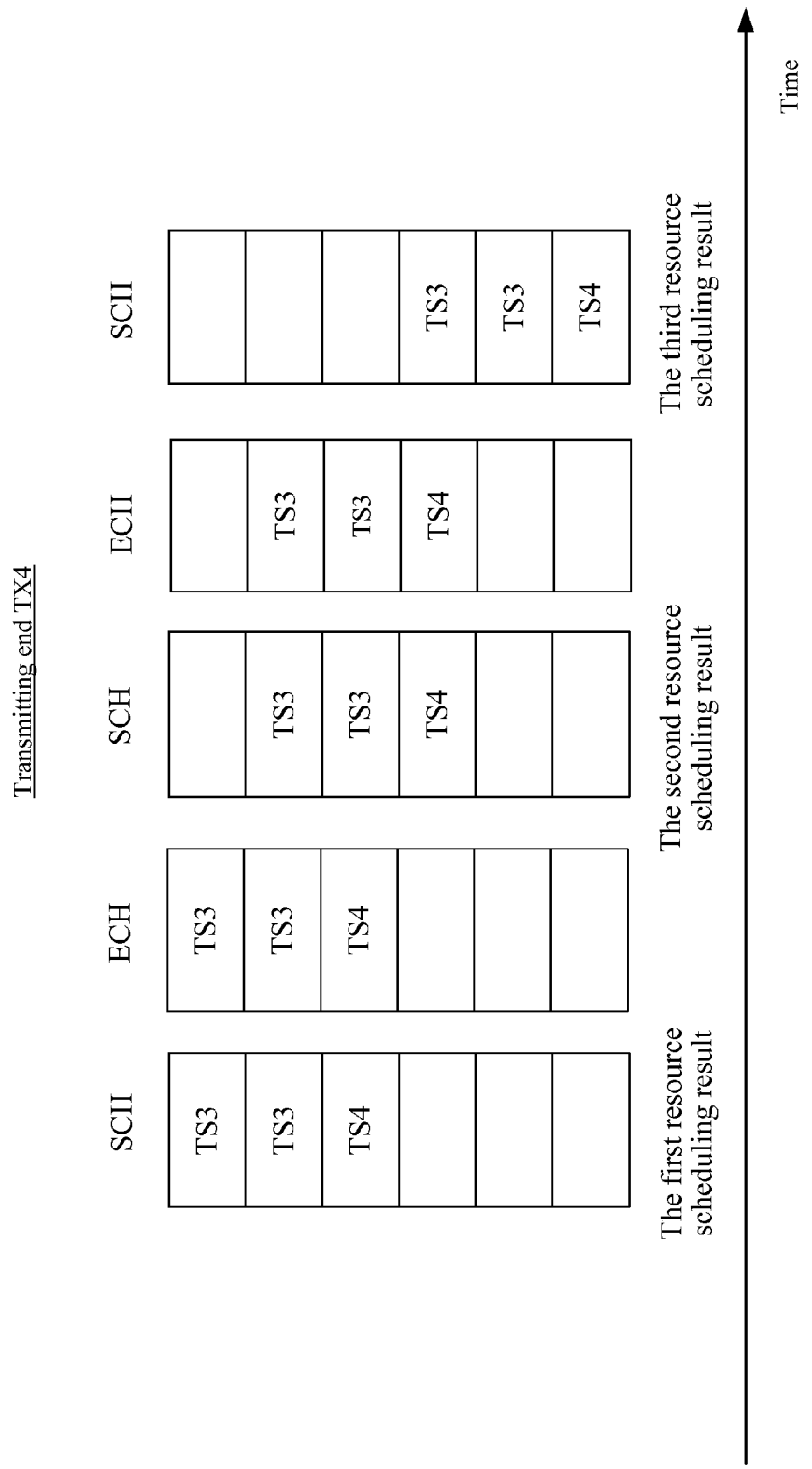
FIG. 2H depicts transmitting end sequences received in the scheduling channel SCH and transmitting end sequences sent in the echo channel ECH by the transmitting end TX4 according to the second embodiment of the present invention.

Referring to FIG. 2H, in response to the first resource scheduling result of the receiving end RX3, the transmitting end TX4 receives the transmitting end sequence TS3 in the scheduling resource blocks SRB1~SRB2, and receives the transmitting end sequence TS4 in the scheduling resource block SRB3. Then, the transmitting end TX4 sends the transmitting end sequences, which are received by the transmitting end TX4 in the scheduling channel SCH, via the echo channel ECH (i.e., to send the transmitting end sequence TS3 in the echo resource blocks ERB1~ERB2 and send the transmitting end sequence TS4 in the echo resource block ERB3).

Afterwards, in response to the second resource scheduling result of the receiving end RX3, the transmitting end TX4 receives the transmitting end sequence TS3 in the scheduling resource blocks SRB2~SRB3, and receives the transmitting end sequence TS4 in the scheduling resource block SRB4. Then, the transmitting end TX3 sends the transmitting end sequences, which are received by the transmitting end TX3 in the scheduling channel SCH, via the echo channel ECH (i.e., to send the transmitting end sequence TS3 in the echo resource blocks ERB2~ERB3 and send the transmitting end sequence TS4 in the echo resource block ERB4). Finally, in response to the third resource scheduling result of the receiving end RX3, the transmitting end TX4 receives the transmitting end sequence TS3 in the scheduling resource blocks SRB4~SRB5, and receives the transmitting end sequence TS4 in the scheduling resource block SRB6.

Accordingly, the transmitting end TX1 can use the data resource block sets DRBS_1~DRBS_2 for data transmission according to the transmitting end sequence TS1 of the scheduling resource blocks SRB1~SRB2; the transmitting end TX2 can use the data resource block set DRBS_3 for data transmission according to the transmitting end sequence TS2 of the scheduling resource block SRB3; the transmitting end TX3 can use the data resource block sets DRBS_4~DRBS_5 for data transmission according to the transmitting end sequence TS3 of the scheduling resource blocks SRB4~SRB5; and the transmitting end TX4 can use the data resource block set DRBS_6 for data transmission according to the transmitting end sequence TS4 of the scheduling resource block SRB6. As can be known from this, through the first to the third resource scheduling procedures described above, the present invention can avoid that the receiving ends RX1, RX2 and RX3 allocate a same data resource block set DRBS_i to different transmitting ends simultaneously.

Figure 3:
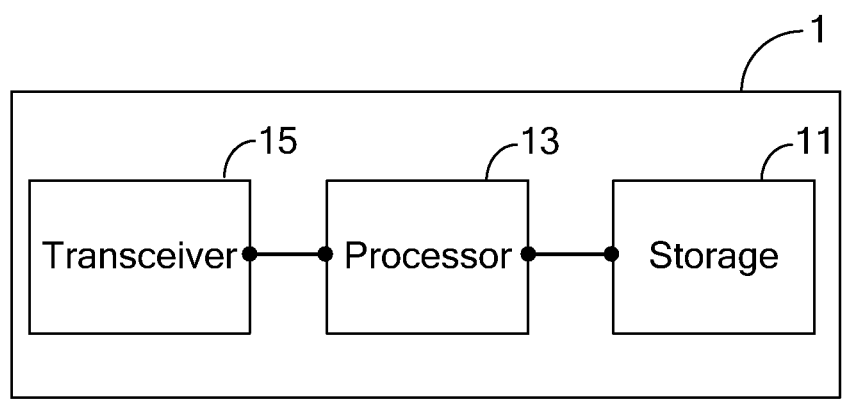
FIG. 3 is a schematic view of a D2D UE according to a third embodiment to a sixth embodiment of the present invention.

A third embodiment of the present invention is shown in FIG. 3, which is a schematic view of a D2D UE 1. The D2D UE 1 is used in a wireless communication system, and comprises a storage 11, a processor 13 and a transceiver 15. The storage 11 is configured to store a plurality of pieces of resource demand information and a plurality of priority values of a plurality of transmitting ends as well as a plurality of transmitting end sequences. The resource demand information of each of the transmitting ends indicates the wireless resource needed by the transmitting end to transmit data. The processor 13 is electrically connected to the storage 11 and the transceiver 15. As described in the previous embodiments, the wireless communication system defines a scheduling channel, an echo channel and a plurality of data resource block sets. The scheduling channel comprises a plurality of scheduling resource blocks, and the echo channel comprises a plurality of echo resource blocks. The scheduling channel and the echo channel correspond to each other, and the scheduling resource blocks and the data resource block sets correspond to each other.

Specifically, the D2D UE 1 is located in a network topology that includes a plurality of transmitting ends and a plurality of receiving ends. These receiving ends and transmitting ends are all D2D UEs, and have functions identical to those of the D2D UE 1. The network topology has a maximum and farthest hop number of 2N+1, where N is a natural number. In this embodiment, the maximum and farthest hop number is 3, so N is 1. The D2D UE 1 is a receiving end, which may be either of the receiving ends RX1 and RX2 of the first embodiment.

The processor 13 generates a first resource scheduling result according to the resource demand information and the priority value of each of the transmitting ends. Then, the processor 13 sends one of the transmitting end sequences respectively in the scheduling resource blocks via the transceiver 15 according to the first resource scheduling result. For example, when the D2D UE 1 is the receiving end RX1 of the first embodiment, the processor 13 sends the transmitting end sequence TS1 in the scheduling resource blocks SRB1~SRB2, and sends the transmitting end sequence TS2 in the scheduling resource blocks SRB3~SRB5 via the transceiver 15. Afterwards, the processor 13 receives at least one of the transmitting end sequences respectively in the echo resource blocks via the transceiver 15. For example, when the D2D UE 1 is the receiving end RX1 of the first embodiment, the processor 13 receives the transmitting end sequences TS1 and TS2 simultaneously in the echo resource blocks ERB1~ERB2, and receives the transmitting end sequence TS2 in the echo resource blocks ERB3~ERB5 via the transceiver 15.

Then, the processor 13 generates a second resource scheduling result according to the transmitting end sequences received from the echo resource blocks and the priority values, and sends one of the transmitting end sequences respectively in the scheduling resource blocks via the transceiver 15 according to the second resource scheduling result. For example, when the D2D UE 1 is the receiving end RX1 of the first embodiment, the processor 13 sends the transmitting end sequence TS1 in the scheduling resource blocks SRB1~SRB2, and sends the transmitting end sequence TS2 in the scheduling resource blocks SRB3~SRB5 via the transceiver 15.

Please also refer to FIG. 3 for a fourth embodiment of the present invention. Different from the third embodiment, the D2D UE 1 of the fourth embodiment is located in a network topology, and the network topology has a maximum and farthest hop number of 2N+1, where N is greater than 1. Besides executing the operations described in the third embodiment, the processor 13 in this embodiment further executes the following operations for N−1 times, and i is 2 to N: receiving at least one of the transmitting end sequences respectively in the echo resource blocks via the transceiver; generating a $(i+1)^{th}$ resource scheduling result according to the transmitting end sequences received from the echo resource blocks and the priority values; and sending one of the transmitting end sequences respectively in the scheduling resource blocks via the transceiver according to the $(i+1)^{th}$ resource scheduling result.

Take a case where the D2D UE 1 is the receiving end RX2 of the second embodiment and N=2 as an example. The processor 13 generates a first resource scheduling result according to the resource demand information and the priority value of each of the transmitting ends and, according to the first resource scheduling result, sends the transmitting end sequence TS2 in the scheduling resource block SRB1 and sends the transmitting end sequence TS3 in the scheduling resource blocks SRB2~SRB3 via the transceiver 15. Afterwards, the processor 13 receives the transmitting end sequences TS1, TS2 and TS3 simultaneously in the echo resource block ERB1, receives the transmitting end sequences TS1 and TS3 simultaneously in the echo resource block ERB2, and receives the transmitting end sequences TS2, TS3 and TS4 simultaneously in the echo resource block ERB3 via the transceiver 15.

Then, the processor 13 generates a second resource scheduling result according to the transmitting end sequences received from the echo resource blocks and the priority values and, according to the second resource scheduling result, sends the transmitting end sequence TS2 in the scheduling resource block SRB3 and sends the transmitting end sequence TS3 in the scheduling resource blocks SRB4~SRB5 via the transceiver 15. Then, the processor 13 receives the transmitting end sequence TS1 in the echo resource block ERB1, receives the transmitting end sequences TS1 and TS3 simultaneously in the echo resource block ERB2, receives the transmitting end sequences TS2 and TS3 simultaneously in the echo resource block ERB3, receives the transmitting end sequences TS3 and TS4 simultaneously in the echo resource block ERB4, and receives the transmitting end sequence TS3 in the echo resource block ERB5 via the transceiver 15. Finally, the processor 13 generates a third resource scheduling result according to the transmitting end sequences received from the echo resource blocks and the priority values and, according to the third resource scheduling result, sends the transmitting end sequence TS2 in the scheduling resource block SRB3 and sends the transmitting end sequence TS3 in the scheduling resource blocks SRB4~SRB5 via the transceiver 15.

In other embodiments, besides further executing the aforesaid operations for N−1 times, the processor 13 may further execute the aforesaid operations for M times more, where M represents an adjustment number and is a natural number. In other words, the processor 13 further executes the following operations for N+M−1 times, and i is 2 to N+M: receiving at least one of the transmitting end sequences respectively in the echo resource blocks via the transceiver; generating a $(i+1)^{th}$ resource scheduling result according to the transmitting end sequences received from the echo resource blocks and the priority values; and sending one of the transmitting end sequences respectively in the scheduling resource blocks via the transceiver according to the $(i+1)^{th}$ resource scheduling result.

The adjustment number M may be decided by the backhaul network server, and is informed to each of the transmitting ends and the receiving ends; or may be decided by the processor 13 through executing an adjustment procedure. For example, the adjustment number M may be decided by the backhaul network server according to a fact that there is a D2D UE moving at a high speed in the network topology so as to avoid that the wireless resources can not be appropriately allocated to the transmitting ends due to an insufficient number of times of the resource scheduling procedure being executed by the receiving ends when a change in the maximum and farthest hop number is caused by the D2D UE moving at a high speed. Additionally, in the adjustment procedure, the processor 13 may also determine that the D2D UE 1 itself or one of surrounding D2D UEs is moving at a high speed, decide the adjustment number M correspondingly, and then informs the adjustment number M to each of the transmitting ends and the receiving ends via the backhaul network server.

Please also refer to FIG. 3 for a fifth embodiment of the present invention. In this embodiment, the maximum and farthest hop number is 3, so N is 1. The D2D UE 1 is a transmitting end, which may be either of the receiving ends TX1 and TX2 of the first embodiment. The processor 13 executes the following operations: (a) receive at least one of the transmitting end sequences respectively from the scheduling resource blocks via the transceiver 15; (b) transmit at least one of the transmitting end sequences respectively in the echo resource blocks via the transceiver 15, where the at least one transmitting end sequence transmitted in the echo resource blocks is the same as the at least one transmitting end sequence received from the scheduling resource blocks; and (c) receive at least one of the transmitting end sequences respectively from the scheduling resource blocks via the transceiver 15 again.

Taking the receiving end TX2 of the first embodiment as an example, the processor 13 receives the transmitting end sequences TS1 and TS2 simultaneously from the scheduling resource blocks SRB1~SRB2, and receives the transmitting end sequence TS2 from the scheduling resource blocks SRB3~SRB4 via the transceiver 15. Then, the processor 13 sends the transmitting end sequences TS1 and TS2 in the echo resource blocks ERB1~ERB2, and sends the transmitting end sequence TS2 in the echo resource blocks ERB3~ERB5 via the transceiver 15. Finally, the processor 13 receives the transmitting end sequence TS1 from the scheduling resource blocks SRB1~SRB2 and receives the transmitting end sequence TS2 from the scheduling resource blocks SRB3~SRB5 via the transceiver 15 again.

Please also refer to FIG. 3 for a sixth embodiment of the present invention. Different from the fifth embodiment, the D2D UE 1 is located in a network topology which has a maximum and farthest hop number of 2N+1, where N is greater than 1. In this embodiment, besides further executing the operations (a)-(c) described in the fourth embodiment, the processor 13 further repeatedly executes the operations (b) and (c) for N−1 times after the operation (c).

Take a case where the D2D UE 1 is the transmitting end TX3 of the second embodiment and N=2 as an example. The processor 13 receives the transmitting end sequences TS2 and TS3 simultaneously from the scheduling resource block SRB1, receives the transmitting end sequence TS3 from the scheduling resource block SRB2, and receives the transmitting end sequences TS3 and TS4 simultaneously from the scheduling resource block SRB3 via the transceiver 15. Then, the processor 13 sends the transmitting end sequences TS1 and TS3 in the echo resource block ERB1, sends the transmitting end sequence TS3 in the echo resource block ERB2, and sends the transmitting end sequences TS3 and TS4 in the echo resource block ERB3 via the transceiver 15.

Afterwards, the processor 13 receives the transmitting end sequence TS3 from the scheduling resource block SRB2, receives the transmitting end sequences TS2 and TS3 simultaneously from the scheduling resource block SRB3, receives the transmitting end sequences TS3 and TS4 simultaneously from the scheduling resource block SRB4, and receives the transmitting end sequence TS3 from the scheduling resource block SRB5 via the transceiver 15. Then, the processor 13 sends the transmitting end sequence TS3 in the echo resource block ERB2, sends the transmitting end sequences TS2 and TS3 in the echo resource block ERB3, sends the transmitting end sequences TS3 and TS4 in the echo resource block ERB4, and sends the transmitting end sequence TS3 in the echo resource block ERB5 via the transceiver 15. Finally, the processor 13 receives the transmitting end sequence TS2 from the scheduling resource block SRB3, receives the transmitting end sequence TS3 from the scheduling resource blocks SRB3~SRB4, and receives the transmitting end sequence TS4 from the scheduling resource block SRB5 via the transceiver 15.

Similarly, besides further executing the aforesaid operations for N−1 times, the processor 13 in other embodiments may further execute the aforesaid operations for M times more, where M is an adjustment number and is a natural number. In other words, the processor 13 further repeatedly executes the operations (b) and (c) for N+M−1 times after the operation (c). As described above, the adjustment number M may be decided by the backhaul network server and then informed to each of the transmitting ends and the receiving ends; or may be decided by the processor 13 through executing an adjustment procedure.

Figure 4:
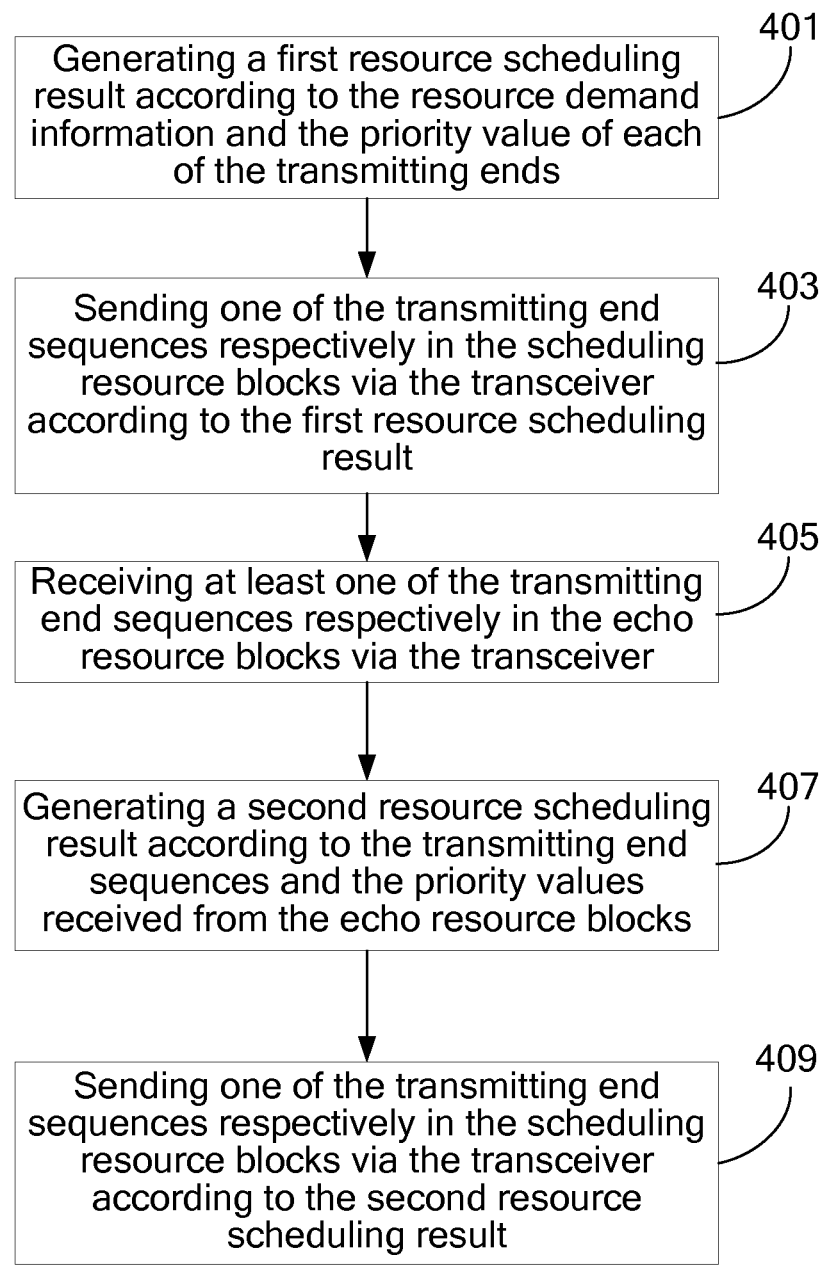
FIG. 4 is a flowchart diagram of a resource scheduling method according to a seventh embodiment of the present invention.

A seventh embodiment of the present invention is shown in FIG. 4, which is a flowchart diagram of a resource scheduling method. The resource scheduling method is used for a D2D UE (e.g., either of the receiving ends RX1 and RX2 of the first embodiment). The D2D UE is used in a wireless communication system and is located in a network topology that includes a plurality of transmitting ends and a plurality of receiving ends. The D2D UE is one of the receiving ends. The D2D UE comprises a transceiver, a storage and a processor. The storage is configured to store a plurality of pieces of resource demand information and a plurality of priority values of the transmitting ends as well as a plurality of transmitting end sequences. Each of the transmitting ends corresponding to one of the transmitting end sequences. The wireless communication system defines a scheduling channel, an echo channel and a plurality of data resource block sets. The scheduling channel comprises a plurality of scheduling resource blocks, and the echo channel comprises a plurality of echo resource blocks. The scheduling channel and the echo channel correspond to each other, and the scheduling resource blocks and the data resource block sets correspond to each other. The resource scheduling method is executed by the processor.

Firstly, step 401 is executed to generate a first resource scheduling result according to the resource demand information and the priority value of each of the transmitting ends. Then, step 403 is executed to send one of the transmitting end sequences respectively in the scheduling resource blocks via the transceiver according to the first resource scheduling result. Then, step 405 is executed to receive at least one of the transmitting end sequences respectively in the echo resource blocks via the transceiver.

Afterwards, step 407 is executed to generate a second resource scheduling result according to the transmitting end sequences received from the echo resource blocks and the priority values. Next, step 409 is executed to send one of the transmitting end sequences respectively in the scheduling resource blocks via the transceiver according to the second resource scheduling result.

Additionally, in other embodiments, the network topology has a maximum and farthest hop number of 2N+1, where N is a natural number. The resource scheduling method of the present invention may further comprise the following steps and the processor further executes the following steps for N−1 times, where i is 2 to N: receiving at least one of the transmitting end sequences respectively in the echo resource blocks via the transceiver; generating a $(i+1)^{th}$ resource scheduling result according to the transmitting end sequences received from the echo resource blocks and the priority values; and sending one of the transmitting end sequences respectively in the scheduling resource blocks via the transceiver according to the $(i+1)^{th}$ resource scheduling result.

Furthermore, in other embodiments, the network topology has a maximum and farthest hop number of 2N+1, where N is a natural number. The resource scheduling method of the present invention may further comprise the following steps and the processor further executes the following steps for N+M−1 times, where M represents an adjustment number and is a natural number, and i is 2 to N+M: receiving at least one of the transmitting end sequences respectively in the echo resource blocks via the transceiver; generating a $(i+1)^{th}$ resource scheduling result according to the transmitting end sequences received from the echo resource blocks and the priority values; and sending one of the transmitting end sequences respectively in the scheduling resource blocks via the transceiver according to the $(i+1)^{th}$ resource scheduling result.

In addition to the aforesaid steps, the resource scheduling method of this embodiment can also execute all the operations and have all the corresponding functions set forth in the previous embodiments. How the resource scheduling method of this embodiment executes these operations and have these functions will be readily appreciated by those of ordinary skill in the art based on the disclosures of the previous embodiments, and thus will not be further described herein.

Figure 5:
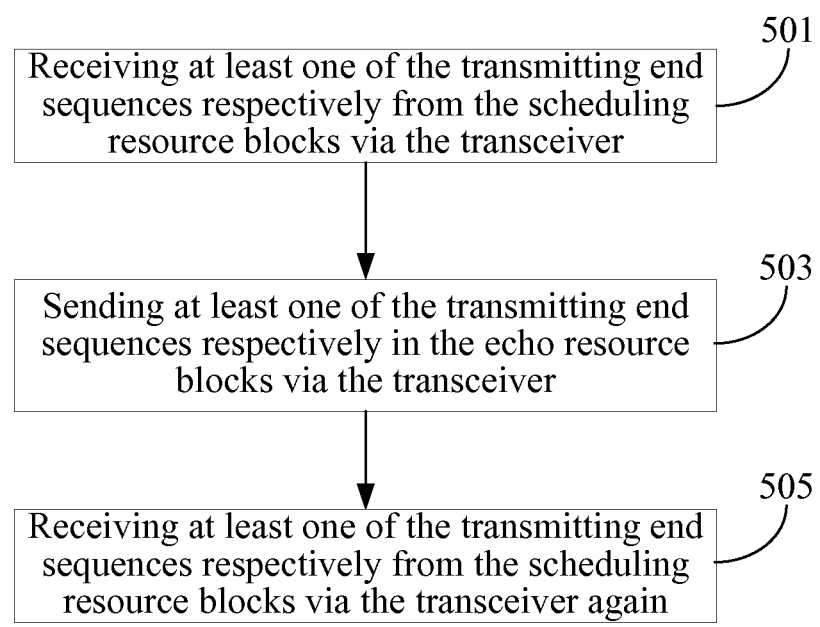
FIG. 5 is a flowchart diagram of a resource scheduling method according to an eighth embodiment of the present invention.

An eighth embodiment of the present invention is shown in FIG. 5, which is a flowchart diagram of a resource scheduling method. The resource scheduling method is used for a D2D UE. The D2D UE is used in a wireless communication system and is located in a network topology. The network topology includes a plurality of transmitting ends and a plurality of receiving ends. The D2D UE is one of the transmitting ends (e.g., either of the transmitting ends TX1 and TX2 of the first embodiment). The D2D UE comprises a transceiver, a storage and a processor. The storage is configured to store a plurality of transmitting end sequences of the transmitting ends. The wireless communication system defines a scheduling channel, an echo channel and a plurality of data resource block sets. The scheduling channel comprises a plurality of scheduling resource blocks, and the echo channel comprises a plurality of echo resource blocks.

The scheduling channel and the echo channel correspond to each other, and the scheduling resource blocks and the data resource block sets correspond to each other. The resource scheduling method is executed by the processor.

Firstly, step 501 is executed to receive at least one of the transmitting end sequences respectively from the scheduling resource blocks via the transceiver. Then, step 503 is executed to transmit at least one of the transmitting end sequences respectively in the echo resource blocks via the transceiver. The at least one transmitting end sequence transmitted in the echo resource blocks is the same as the at least one transmitting end sequence received from the scheduling resource blocks. Afterwards, step 505 is executed to receive at least one of the transmitting end sequences respectively from the scheduling resource blocks via the transceiver again.

In other embodiments, the network topology has a maximum and farthest hop number of 2N+1, where N is a natural number. The resource scheduling method of the present invention may further comprise the following step of: repeatedly executing the step 503 and the step 505 for N−1 times after the step 505.

In other embodiments, the D2D UE has a maximum and farthest hop number of 2N+1, where N is a natural number. The resource scheduling method of the present invention may further comprise the following step of: repeatedly executing the step 503 and the step 505 for N+M−1 times after the step 505, where M represents an adjustment number and is a natural number.

In addition to the aforesaid steps, the resource scheduling method of this embodiment can also execute all the operations and have all the corresponding functions set forth in the previous embodiments. How the resource scheduling method of this embodiment executes these operations and have these functions will be readily appreciated by those of ordinary skill in the art based on the disclosures of the previous embodiments, and thus will not be further described herein.

According to the above descriptions, the resource scheduling mechanism of the present invention is adapted for a wireless communication system adopting the OFDMA communication technology. This allows the D2D UEs to obtain wireless resources necessary for direct mode communication with adjacent D2D UEs in a distributed way and through two-dimensional time-frequency contention. Thereby, as compared with the conventional contending-for-scheduling mechanisms of the purely distributed type, the present invention can reduce the idle time and improve the spectrum utilization efficiency so as to improve the quality of service (QoS).

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A device-to-device (D2D) user equipment (UE) for a wireless communication system, the wireless communication system defining a scheduling channel, an echo channel and a plurality of data resource block sets, the scheduling channel comprising a plurality of scheduling resource blocks, the echo channel comprising a plurality of echo resource blocks, the scheduling channel and the echo channel corresponding to each other, the scheduling resource blocks and the data resource block sets corresponding to each other, the D2D UE being located in a network topology that includes a plurality of transmitting ends and a plurality of receiving ends, and the D2D UE being one of the receiving ends, the D2D UE comprising:
a transceiver;
a storage, being configured to store resource demand information and a priority value of each of the transmitting ends, and a plurality of transmitting end sequences, wherein each of the transmitting ends corresponds to one of the transmitting end sequences; and
a processor electrically connected to the transceiver and the storage, being configured to execute the following operations:
generating a first resource scheduling result according to the resource demand information and the priority value of each of the transmitting ends;
sending one of the transmitting end sequences respectively in the scheduling resource blocks via the transceiver according to the first resource scheduling result;
receiving at least one of the transmitting end sequences respectively in the echo resource blocks via the transceiver;
generating a second resource scheduling result according to the transmitting end sequences received from the echo resource blocks and the priority values of the transmitting ends; and
sending one of the transmitting end sequences respectively in the scheduling resource blocks via the transceiver according to the second resource scheduling result.

2. The D2D UE of claim 1, wherein the network topology has a maximum and farthest hop number of 2N+1, where N is a natural number, and the processor is further configured to execute the following operations for N−1 times, where i is 2 to N:
receiving at least one of the transmitting end sequences respectively in the echo resource blocks via the transceiver;
generating a $(i+1)^{th}$ resource scheduling result according to the transmitting end sequences received from the echo resource blocks and the priority values; and
sending one of the transmitting end sequences respectively in the scheduling resource blocks via the transceiver according to the $(i+1)^{th}$ resource scheduling result.

3. The D2D UE of claim 2, wherein the transmitting ends and the receiving ends connect to a backhaul network server, and the backhaul network server decides the maximum and farthest hop number and informs the transmitting ends and the receiving ends of the maximum and farthest hop number.

4. The D2D UE of claim 1, wherein there is a maximum and farthest hop number of 2N+1, where N is a natural number, and the processor is further configured to execute the following operations for N+M−1 times, where M represents an adjustment number and is a natural number, and i is 2 to N+M:
receiving at least one of the transmitting end sequences respectively in the echo resource blocks via the transceiver;
generating a $(i+1)^{th}$ resource scheduling result according to the transmitting end sequences received from the echo resource blocks and the priority values; and sending one of the transmitting end sequences respectively in the scheduling resource blocks via the transceiver according to the $(i+1)^{th}$ resource scheduling result.

5. The D2D UE of claim 4, wherein the transmitting ends and the receiving ends connect to a backhaul network server, and the backhaul network server decides the maximum and farthest hop number and the adjustment number, and informs the transmitting ends and the receiving ends of the maximum and farthest hop number and the adjustment number.

6. The D2D UE of claim 4, wherein the processor executes an adjustment procedure to decide the adjustment number.

7. A resource scheduling method for a device-to-device (D2D) user equipment (UE), the D2D UE being used in a wireless communication system and being located in a network topology that includes a plurality of transmitting ends and a plurality of receiving ends, the D2D UE being one of the receiving ends and comprising a transceiver, a storage and a processor, the storage being configured to store resource demand information and a priority value of each of the transmitting ends and a plurality of transmitting end sequences, each of the transmitting ends corresponding to one of the transmitting end sequences, the wireless communication system defining a scheduling channel, an echo channel and a plurality of data resource block sets, the scheduling channel comprising a plurality of scheduling resource blocks, the echo channel comprising a plurality of echo resource blocks, the scheduling channel and the echo channel corresponding to each other, the scheduling resource blocks and the data resource block sets corresponding to each other, the resource scheduling method being executed by the processor, the method comprising:
  generating a first resource scheduling result according to the resource demand information and the priority value of each of the transmitting ends;
  sending one of the transmitting end sequences respectively in the scheduling resource blocks via the transceiver according to the first resource scheduling result;
  receiving at least one of the transmitting end sequences respectively in the echo resource blocks via the transceiver;
  generating a second resource scheduling result according to the transmitting end sequences received from the echo resource blocks and the priority values of the transmitting ends; and
  sending one of the transmitting end sequences respectively in the scheduling resource blocks via the transceiver according to the second resource scheduling result.

8. The resource scheduling method of claim 7, wherein the network topology has a maximum and farthest hop number of 2N+1, where N is a natural number, and the resource scheduling method further comprises the following steps and the processor further executes the following steps for N−1 times, where i is 2 to N:
  receiving at least one of the transmitting end sequences respectively in the echo resource blocks via the transceiver;
  generating a $(i+1)^{th}$ resource scheduling result according to the transmitting end sequences received from the echo resource blocks and the priority values; and
  sending one of the transmitting end sequences respectively in the scheduling resource blocks via the transceiver according to the $(i+1)^{th}$ resource scheduling result.

9. The resource scheduling method of claim 8, wherein the transmitting ends and the receiving ends connect to a backhaul network server, and the backhaul network server decides the maximum and farthest hop number and informs the transmitting ends and the receiving ends of the maximum and farthest hop number.

10. The resource scheduling method of claim 7, wherein the network topology has a maximum and farthest hop number of 2N+1, where N is a natural number, and the resource scheduling method further comprises the following steps and the processor further executes the following steps for N+M−1 times, where M represents an adjustment number and is a natural number, and i is 2 to N+M:
  receiving at least one of the transmitting end sequences respectively in the echo resource blocks via the transceiver;
  generating a $(i+1)^{th}$ resource scheduling result according to the transmitting end sequences received from the echo resource blocks and the priority values; and
  sending one of the transmitting end sequences respectively in the scheduling resource blocks via the transceiver according to the $(i+1)^{th}$ resource scheduling result.

11. The resource scheduling method of claim 10, wherein the transmitting ends and the receiving ends connect to a backhaul network server, and the backhaul network server decides the maximum and farthest hop number and the adjustment number, and informs the transmitting ends and the receiving ends of the maximum and farthest hop number and the adjustment number.

12. The resource scheduling method of claim 10, further comprising executing an adjustment procedure to decide the adjustment number.

13. A device-to-device (D2D) user equipment (UE) for a wireless communication system, the wireless communication system defining a scheduling channel, an echo channel and a plurality of data resource block sets, the scheduling channel comprising a plurality of scheduling resource blocks, the echo channel comprising a plurality of echo resource blocks, the scheduling channel and the echo channel corresponding to each other, the scheduling resource blocks and the data resource block sets corresponding to each other, the D2D UE being located in a network topology that includes a plurality of transmitting ends and a plurality of receiving ends, and the D2D UE being one of the transmitting ends, the D2D UE comprising:
  a transceiver;
  a storage, being configured to store a plurality of transmitting end sequences, wherein the D2D UE corresponds to one of the transmitting end sequences; and
  a processor electrically connected to the transceiver and the storage, being configured to execute the following operations:
    (a) receiving at least one of the transmitting end sequences respectively from the scheduling resource blocks via the transceiver;
    (b) sending at least one of the transmitting end sequences respectively in the echo resource blocks via the transceiver, wherein the at least one transmitting end sequence transmitted in the echo resource blocks is the same as the at least one transmitting end sequence received from the scheduling resource blocks; and
    (c) receiving at least one of the transmitting end sequences respectively again from the scheduling resource blocks via the transceiver;

wherein the network topology has a maximum and farthest hop number of 2N+1, where N is a natural number, and the processor is further configured to repeatedly execute the operations (b) and (c) for N−1 times after the operation (c).

14. The D2D UE of claim 13, wherein the transmitting ends and the receiving ends connect to a backhaul network server, and the backhaul network server decides the maximum and farthest hop number and informs the transmitting ends and the receiving ends of the maximum and farthest hop number.

15. A device-to-device (D2D) user equipment (UE) for a wireless communication system, the wireless communication system defining a scheduling channel, an echo channel and a plurality of data resource block sets, the scheduling channel comprising a plurality of scheduling resource blocks, the echo channel comprising a plurality of echo resource blocks, the scheduling channel and the echo channel corresponding to each other, the scheduling resource blocks and the data resource block sets corresponding to each other, the D2D UE being located in a network topology that includes a plurality of transmitting ends and a plurality of receiving ends, and the D2D UE being one of the transmitting ends, the D2D UE comprising:
  a transceiver;
  a storage, being configured to store a plurality of transmitting end sequences, wherein the D2D UE corresponds to one of the transmitting end sequences; and
  a processor electrically connected to the transceiver and the storage, being configured to execute the following operations:
    (a) receiving at least one of the transmitting end sequences respectively from the scheduling resource blocks via the transceiver;
    (b) sending at least one of the transmitting end sequences respectively in the echo resource blocks via the transceiver, wherein the at least one transmitting end sequence transmitted in the echo resource blocks is the same as the at least one transmitting end sequence received from the scheduling resource blocks; and
    (c) receiving at least one of the transmitting end sequences respectively again from the scheduling resource blocks via the transceiver;
  wherein the network topology has a maximum and farthest hop number of 2N+1, where N is a natural number, and the processor is further configured to repeatedly execute the operations (b) and (c) for N+M−1 times after the operation (c), where M represents an adjustment number and is a natural number.

16. The D2D UE of claim 15, wherein the transmitting ends and the receiving ends connect to a backhaul network server, and the backhaul network server decides the maximum and farthest hop number and the adjustment number, and informs the transmitting ends and the receiving ends of the maximum and farthest hop number and the adjustment number.

17. The D2D UE of claim 15, wherein the processor further executes an adjustment procedure to decide the adjustment number.

18. A resource scheduling method for a device-to-device (D2D) user equipment (UE), the D2D UE being used in a wireless communication system and being located in a network topology that includes a plurality of transmitting ends and a plurality of receiving ends, the D2D UE being one of the transmitting ends and comprising a transceiver, a storage and a processor, the storage being configured to store a plurality of transmitting end sequences, the D2D UE corresponding to one of the transmitting end sequences, the wireless communication system defining a scheduling channel, an echo channel and a plurality of data resource block sets, the scheduling channel comprising a plurality of scheduling resource blocks, the echo channel comprising a plurality of echo resource blocks, the scheduling channel and the echo channel corresponding to each other, the scheduling resource blocks and the data resource block sets corresponding to each other, the resource scheduling method being executed by the processor and comprising the following steps of:
  (a) receiving at least one of the transmitting end sequences respectively from the scheduling resource blocks via the transceiver;
  (b) transmitting at least one of the transmitting end sequences respectively in the echo resource blocks via the transceiver, wherein the at least one transmitting end sequence transmitted in the echo resource blocks is the same as the at least one transmitting end sequence received from the scheduling resource blocks; and
  (c) receiving at least one of the transmitting end sequences respectively again from the scheduling resource blocks via the transceiver;
  wherein the network topology has a maximum and farthest hop number of 2N+1, where N is a natural number, and the resource scheduling method further comprises the following step of:
  repeatedly executing the step (b) and the step (c) for N−1 times after the step (c).

19. The resource scheduling method of claim 18, wherein the transmitting ends and the receiving ends connect to a backhaul network server, and the backhaul network server decides the maximum and farthest hop number and informs the transmitting ends and the receiving ends of the maximum and farthest hop number.

20. A resource scheduling method for a device-to-device (D2D) user equipment (UE), the D2D UE being used in a wireless communication system and being located in a network topology that includes a plurality of transmitting ends and a plurality of receiving ends, the D2D UE being one of the transmitting ends and comprising a transceiver, a storage and a processor, the storage being configured to store a plurality of transmitting end sequences, the D2D UE corresponding to one of the transmitting end sequences, the wireless communication system defining a scheduling channel, an echo channel and a plurality of data resource block sets, the scheduling channel comprising a plurality of scheduling resource blocks, the echo channel comprising a plurality of echo resource blocks, the scheduling channel and the echo channel corresponding to each other, the scheduling resource blocks and the data resource block sets corresponding to each other, the resource scheduling method being executed by the processor and comprising the following steps of:
  (a) receiving at least one of the transmitting end sequences respectively from the scheduling resource blocks via the transceiver;
  (b) transmitting at least one of the transmitting end sequences respectively in the echo resource blocks via the transceiver, wherein the at least one transmitting end sequence transmitted in the echo resource blocks is the same as the at least one transmitting end sequence received from the scheduling resource blocks; and
  (c) receiving at least one of the transmitting end sequences respectively again from the scheduling resource blocks via the transceiver;

wherein the network topology has a maximum and farthest hop number of 2N+1, where N is a natural number, and the resource scheduling method further comprises the following step of:

repeatedly executing the step (b) and the step (c) for N+M−1 times after the step (c), where M is an adjustment number and is a natural number.

21. The resource scheduling method of claim 20, wherein the transmitting ends and the receiving ends connect to a backhaul network server, and the backhaul network server decides the maximum and farthest hop number and the adjustment number, and informs the transmitting ends and the receiving ends of the maximum and farthest hop number and the adjustment number.

22. The resource scheduling method of claim 20, further comprising executing an adjustment procedure to decide the adjustment number.

\* \* \* \* \*